United States Patent
Emerick et al.

(10) Patent No.: US 11,449,469 B2
(45) Date of Patent: Sep. 20, 2022

(54) EMBEDDED CONTENT OBJECT COLLABORATION

(71) Applicant: Box, Inc., Redwood City, CA (US)

(72) Inventors: Brian James Emerick, Mountain View, CA (US); Zachary Kelly, Redwood City, CA (US); Swaroop Butala, Fremont, CA (US); Ke Huang, Mountain View, CA (US); Kevin Tsoi, San Francisco, CA (US); Naeim Semsarilar, San Carlos, CA (US)

(73) Assignee: Box, Inc.

( * ) Notice: Subject to any disclaimer, the term of this patent is extended or adjusted under 35 U.S.C. 154(b) by 123 days.

(21) Appl. No.: 16/154,684

(22) Filed: Oct. 8, 2018

(65) Prior Publication Data

US 2019/0108241 A1    Apr. 11, 2019

Related U.S. Application Data

(60) Provisional application No. 62/570,075, filed on Oct. 9, 2017.

(51) Int. Cl.
*G06F 16/176* (2019.01)
*G06F 16/28* (2019.01)
(Continued)

(52) U.S. Cl.
CPC ........ *G06F 16/176* (2019.01); *G06F 16/1734* (2019.01); *G06F 16/288* (2019.01); *G06F 16/9024* (2019.01); *G06F 40/166* (2020.01)

(58) Field of Classification Search
None
See application file for complete search history.

(56) References Cited

U.S. PATENT DOCUMENTS 5,581,686 A * 12/1996 Koppolu ............... G06F 3/0481
715/784
5,966,120 A * 10/1999 Arazi ............... H04N 21/23424
345/12

(Continued)

OTHER PUBLICATIONS

Willie Lowery, How to Add a CLickable Overlay to your Youtube Videos—youtube.mp4 Jan. 5, 2013, Youtube.com, https://www.youtube.com/watch?v=a7BVZzarHRo&feature=emb_logo.*

(Continued)

*Primary Examiner* — Belix M Ortiz Ditren
(74) *Attorney, Agent, or Firm* — Vista IP Law Group, LLP

(57) ABSTRACT

Systems and methods for embedded content object collaboration. A server of a cloud-based content management system hosts an access point to a set of executable code. The executable code is configured to facilitate interaction with a user. The user initiates operations that are performed either at the cloud-based content management system or at the at least one user device, or both. The operations include (1) user interactions with a shared content object, (2) user selection of at least one embedded content object within the shared content object, (3) editing the embedded content object at the at least one user device, (4) replicating one or more changes performed on the embedded content object to a remotely-stored instance of the embedded content object, and (5) downloading at least a portion of the updated, remotely-stored instance of the embedded content object to the user device.

30 Claims, 20 Drawing Sheets

(51) Int. Cl.
*G06F 16/17* (2019.01)
*G06F 16/901* (2019.01)
*G06F 40/166* (2020.01)

(56) References Cited

U.S. PATENT DOCUMENTS

| | | | | |
|---|---|---|---|---|
| RE42,728 E | * | 9/2011 | Madrane | G11B 27/034 715/716 |
| 2004/0096110 A1 | * | 5/2004 | Yogeshwar | G06F 16/51 382/239 |
| 2009/0007018 A1 | * | 1/2009 | Ikeda | G06F 16/54 715/838 |
| 2016/0378274 A1 | * | 12/2016 | Akiner | G06F 3/0482 715/760 |

OTHER PUBLICATIONS

Brooks et al., Inserting and Editing Images in Microsoft Word [date unknown, captured on Jul. 2, 2001 by archive.org], internet4classrooms.com, https://web.archive.org/web/*/https://www.internet4classrooms.com/msword_images.htm.*

Microsoft Computing Dictionary 02, Microsoft, 5th ed., p. 203, 409.*

Sink, Version Control by Example Jul. 2011, Pyrenean Gold Press, 1st ed., 226 pages.*

Mackall, hg(1) 2017, mercurial-scm.org, https://www.mercurial-scm.org/doc/hg.1.html.*

Geisler, Web client for Mercurial with update support? Jul. 30, 2014, stackoverflow.com, https://stackoverflow.com/questions/6596666/web-client-for-mercurial-with-update-support.*

Kallithea date unknown [captured on Aug. 16, 2016 by archive.org], kallithea-scm.org, https://web.archive.org/web/20160816180539/https://kallithea-scm.org/.*

Archived: What is OLE? Jan. 18, 2018, Indiana University https://kb.iu.edu/d/adow.*

Embedded Object date unknown [captured on Apr. 4, 2017 by archive.org], techopedia.com, https://web.archive.org/web/20170404053931/https://www.techopedia.com/definition/3354/embedded-object.*

Native application (native app), Jun. 2011 (captured on Jul. 3, 2011 by archive.org), SearchSoftwareQuality.com, https://web.archive.org/web/20110703092007/https://searchsoftwarequality.techtarget.com/definition/native-application-native-app.*

Kulkarni, 7 Definitions of Cloud Computing! Mar. 24, 2015, esds.com, https://www.esds.co.in/blog/7-definitions-of-cloud-computing/.*

Cloud computing definition [published Jul. 26, 2021; captured Jul. 28, 2021], google.com, https://www.google.com/search?q=cloud+computing+definition&source=Int&tbs=cdr%3A1%2Ccd_min%3A%2Ccd_max%3A10%2F9%2F2017&tbm=.*

Gbjbaanb et al., Communicating between browserand a native application securely, stackexchange.com, https://softwareengineering.stackexchange.com/questions/272019/communicating-between-browser-and-a-native-application-securely.*

ISO/IEC 17788:2014(en) 2014, ISO, ISO/IEC 17788:2014(en) Information technology—Cloud computing—Overview and vocabulary, Section 3.2.5.*

Mell et al., The NIST Definition of Cloud ComputingSept 11, National Institute of Standards and Technology, https://nvlpubs.nist.gov/nistpubs/Legacy/SP/nistspecialpublication800-145.pdf.*

Chentiangemalc, Case of the Missing ActiveX Control (DHTML Edit Control) May 29, 2012, wordpress.com, https://chentiangemalc.wordpress.com/2012/05/29/case-of-the-missing-activex-control-dhtml-edit-control/.*

Kallithea, date unknown [captured on Aug. 5, 2016 by archive.org], kallithea-scm.org, https://web.archive.org/web/20160805210444/https://kallithea-scm.org/.*

"Salesforce Introduces the Quip Collaboration Platform" Salesforce Press and News, Nov. 6, 2017, Dreamforce 2017, San Francisco.

* cited by examiner

EMBEDDED CONTENT OBJECT COLLABORATION

CROSS-REFERENCE TO RELATED APPLICATION(S)

The present application claims the benefit of priority to U.S. Provisional Patent Application Ser. No. 62/570,075 titled "Systems and Methods for Collaboration Insight and Communication", filed Oct. 9, 2017, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

This disclosure relates to collaboration systems, and more particularly to techniques for embedded content object collaboration.

BACKGROUND

The proliferation of cloud-based services and platforms continues to increase. Specifically, cloud-based content management services and platforms have impacted the way personal and corporate electronically stored information objects (e.g., files, images, videos, etc.) are stored, and has also impacted the way such personal and corporate content is shared and managed. One benefit of using such cloud-based platforms is the ability to securely share large volumes of content among trusted collaborators on a variety of user devices such as mobile phones, tablets, laptop computers, desktop computers, and/or other devices. For example, a large enterprise with thousands of users (e.g., employees) and many terabytes of content might use a cloud-based content storage platform to efficiently and securely facilitate content access to various individual users and/or collaborative groups of users.

As a group of collaborators asynchronously interact with a particular shared content object at their respective user devices, the cloud-based platform managing the shared content object will perform various operations to apply any local content object changes (e.g., document edits) invoked by the collaborators to a remotely-stored instance of the shared content object while remediating any change conflicts that may occur. As the collaboration applications used to perform the foregoing content object changes evolve, so does the extent to which users can collaborate. For example, one or more of the collaborators of a first shared content object might want to embed a second shared content object into the first shared content object. Continuing this example, a collaborator might embed a PowerPoint™ presentation (e.g., the second shared content object) into a meeting reminder (e.g., the first shared content object) associated with a meeting at which the presentation is to be reviewed. When a collaborator makes changes to the embedded content object at his/her user device, a variation (e.g., updated version) of the embedded content object is introduced. At the same time, another collaborator might make different changes to his/her copy of the embedded content, thus creating yet another variation, therefore introducing the possibility of conflicting edits between the variations of the embedded content object.

Unfortunately, there are no mechanisms for managing local collaboration activities over shared content objects that are embedded within other shared content objects. What is needed is a way to facilitate collaboration activities over embedded content objects while avoiding change conflicts associated with the embedded content objects.

SUMMARY

The present disclosure describes techniques used in systems, methods, and in computer program products for embedded content object collaboration, which techniques advance the relevant technologies to address technological issues with legacy approaches. More specifically, the present disclosure describes techniques used in systems, methods, and in computer program products for managing collaboration activities over shared content objects that are embedded in other shared content objects. Certain embodiments are directed to technological solutions for automatically replicating local changes over an embedded content object to a remotely-stored shared instance of the embedded content object.

The disclosed embodiments modify and improve over legacy approaches. In particular, the herein-disclosed techniques provide technical solutions that address the technical problems attendant to facilitating collaboration activities over embedded content objects while avoiding conflicts associated with changes made to the embedded content objects. Many of the herein-disclosed embodiments for automatically replicating local changes over an embedded content object to a remotely-stored shared instance of the embedded content object provide specific implementations of solutions to problems in the software arts, namely the solutions pertain to managing collaboration activities over shared content objects that are embedded in other shared content objects. Furthermore, the disclosed techniques serve to solve problems that arise when managing multiple users' activities over embedded content objects. For example, these techniques avoid or resolve conflicts associated with changes made to the embedded content objects.

Some embodiments advance peripheral technical fields as well. As specific examples, use of the disclosed computer equipment, networking equipment, and constituent devices within the shown environments as described herein and as depicted in the figures provide advances in the technical field of human-machine interfaces for collaboration systems as well as advances in various technical fields related to distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

DETAILED DESCRIPTION

Figure 1:
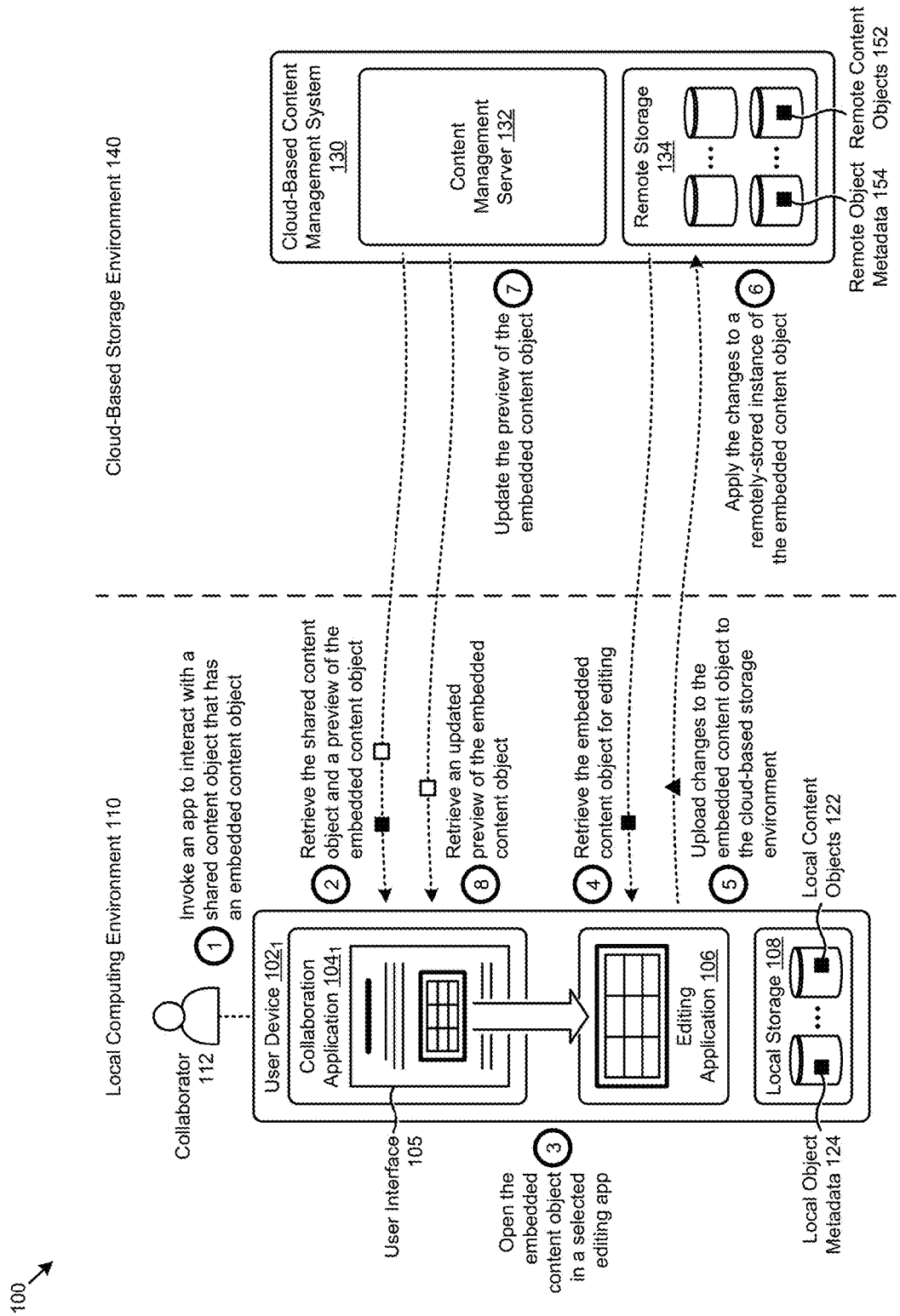
FIG. 1 illustrates a computing environment in which embodiments of the present disclosure can be implemented.

Embodiments in accordance with the present disclosure address the problem of facilitating collaboration activities over embedded content objects while avoiding conflicts associated with changes made to the embedded content objects. Some embodiments are directed to approaches for automatically replicating local changes over an embedded content object to a remotely-stored shared instance of the embedded content object. The accompanying figures and discussions herein present example environments, systems, methods, and computer program products for managing collaboration activities over shared content objects that are embedded in other shared content objects.

Overview

Disclosed herein are techniques for automatically replicating local changes over an embedded content object to a remotely-stored shared instance of the embedded content object. In certain embodiments, a cloud-based content management platform that manages a plurality of shared content objects is identified. One of a plurality of collaborators opens a local instance of a collaboration application on a user device to interact with a particular content object that has at least one embedded content object. A preview of the embedded content object and various associated controls (e.g., an "Edit" button, preview navigation controls, etc.) are presented to the user by the collaboration application. If the collaborator takes action (e.g., clicks an "Edit" button) to edit the embedded content object, an editing application is selected to edit the embedded content object.

A then-current instance of the embedded content object is opened in the editing application. Any changes to the embedded content object that are saved by the editing application on the user device are replicated to a remotely-stored instance of the embedded content object at the cloud-based content management platform. An updated preview of the embedded content object is then presented to the collaborator in the collaboration application. In certain embodiments, any changes to the remotely-stored instance of the embedded content object are broadcast to all collaborators that may be "collabed-in" or otherwise interacting with the embedded content object. In certain embodiments, conflicts associated with changes by multiple collaborators to the embedded content object are remediated by the cloud-based content management platform. In certain embodiments, an object tree that codifies the relationships between embedded content objects and their parent objects is dynamically generated for access by the collaboration application. In certain embodiments, the editing application is selected based at least in part on the object tree, the local user device operating environment, and/or one or more user preferences.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments"

refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to automatically replicating local changes over an embedded content object to a remotely-stored shared instance of the embedded content object. Specifically, the figure presents a logical depiction of how the herein disclosed techniques can be implemented in a computing environment that comprises a cloud-based storage environment and multiple instances of local computing environments to address problems attendant to facilitating locally-performed collaboration activities over embedded content objects while avoiding change conflicts associated with the embedded content objects.

The logical depiction of FIG. 1 illustrates a cloud-based storage environment 140 and one representative instance of a local computing environment 110. The cloud-based storage environment 140 comprises a cloud-based content management system 130 that facilitates collaboration over large volumes of shared content objects by a plurality of users (e.g., collaborators). As can be observed, the cloud-based content management system 130 can comprise one or more instances of a content management server 132 with access to a set of remote storage 134 that stores instances of the shared content remotely from the local computing environment 110.

As an example, a content object from a collection of remote content objects 152 might be stored at remote storage 134 and accessed by and/or collaborated over by one or more of the collaborators. As an example, a collaborator 112 might interact (e.g., create, view, edit, etc.) with a particular content object using a user device $102_1$ in local computing environment 110, whereas one or more other collaborators might interact with the same content object with their respective user devices and local computing environments. A set of remote object metadata 154 associated with the remote content objects 152 might also be stored at remote storage 134. The remote object metadata 154 describe certain attributes associated with the remote content objects 152 such as a name (e.g., file name), an object identifier, a version identifier, a physical storage location, access permissions, and/or other attributes. The content management server 132 uses the remote object metadata 154 and/or other information to manage collaboration activities performed by collaborators over the content objects that comprise the remote content objects 152. Specifically, the content management server 132 has the capability of managing concurrent access to the remote content objects 152 by multiple collaborators (e.g., collaborator 112 and other collaborators) and resolving editing and/or versioning conflicts that might arise from the concurrent access.

In some cases, one or more of the collaborators of a first shared content object might want to embed a second shared content object in the first shared content object. For example, a collaborator might embed a PowerPoint™ presentation (e.g., the second shared content object) in a meeting reminder (e.g., the first shared content object) associated with a meeting at which the presentation is to be reviewed by multiple attendees. When a collaborator makes changes to the embedded content object on a user device, a variation (e.g., updated version) of the embedded content object is introduced. At the same time, other collaborators might make different changes to the embedded content object at their user devices, thereby introducing multiple variations of the embedded content object.

The herein disclosed techniques manage such embedded content object collaboration scenarios by automatically replicating local changes over an embedded content object to a remotely-stored shared instance of the embedded content object. Specifically, a collaboration application to facilitate such techniques is provided at the cloud-based content management system 130. Instances of the collaboration application are downloaded and installed on the user devices of the collaborators.

As shown, a collaboration application $104_1$ is installed on user device $102_1$ of collaborator 112. Collaborator 112 invokes the collaboration application $104_1$ to interact with a particular shared content object that has an embedded content object (operation 1). The collaboration application $104_1$ retrieves the shared content object and a preview of the embedded content object from remote storage 134 of the cloud-based content management system 130 (operation 2). The retrieved shared content object is added to a collection of local content objects 122 that are stored in a set of local storage 108 at user device $102_1$. Certain object metadata associated with the shared content object and/or the embedded content object might also be received and stored in a set of local object metadata 124 at local storage 108. In some cases, the shared content object, the embedded content object preview, and/or any associated object metadata may be retrieved from local storage 108 rather than from remote storage 134 of the cloud-based content management system 130.

From a user interface 105 of collaboration application $104_1$, various interactions with the shared content object and/or the embedded content object can be performed. For example, collaborator 112 might view and/or edit the shared content object. As another example, collaborator 112 might use certain embedded object view controls to navigate through various pages of the embedded content object preview. In some cases, collaborator 112 may open the embedded content object in a selected native editing application for editing (operation 3). The native editing application, represented by an editing application 106, might be selected based at least in part on the object type of the embedded content object as identified in various object metadata associated with the embedded content object. A then-current remotely-stored instance of the embedded content object is retrieved from the cloud-based content management system 130 for editing in the editing application 106 (operation 4).

Any changes to the embedded content object that are saved in the editing application 106 are published to the cloud-based content management system 130 (operation 5). The changes are detected at the cloud-based content management system 130 and applied to a remotely-stored instance of the embedded content object in remote storage 134 (operation 6). In some cases, the changes to the embedded content object will result in one or more updates to any previews or other representations (e.g., thumbnails) associated with the embedded content object (operation 7). Such updates are detected by collaboration application $104_1$ and retrieved for presentation in the user interface 105 (operation 8). The remotely-stored instance of the embedded content object and associated representations (e.g., previews) are maintained (e.g., updated) by cloud-based content management system 130 according to the foregoing operations and/or other herein disclosed techniques to manage various collaboration activities over the embedded content object by collaborator 112 and/or other collaborators while avoiding change conflicts associated with the embedded content object.

The aforementioned embedded content object collaboration management capabilities facilitated by the herein disclosed techniques result in improvements in computer functionality that serve to reduce the demand for computer processing power, reduce the demand for computer memory and data storage, reduce network bandwidth use, and reduce the demand for inter-component communication in computing environments. Specifically, applications of the herein disclosed techniques reduce the consumption of computing and networking resources by automatically updating a remotely-stored instance of an embedded content object in response to changes made to an embedded content object at a particular local computing environment.

One embodiment of techniques for performing such embedded content object collaboration management is disclosed in further detail as follows.

Figure 2:
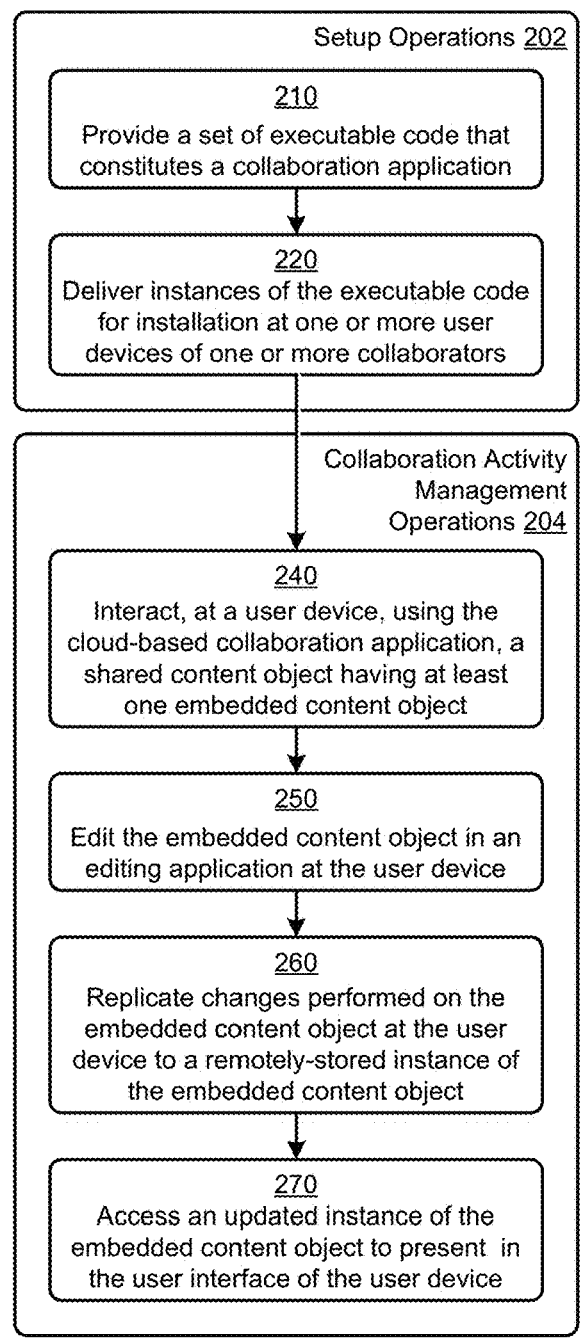
FIG. 2 depicts an embedded content object collaboration management technique as implemented in systems that facilitate collaboration activities over shared content objects that are embedded in other shared content objects, according to an embodiment.

FIG. 2 depicts an embedded content object collaboration management technique 200 as implemented in systems that facilitate collaboration activities over shared content objects that are embedded in other shared content objects. As an option, one or more variations of embedded content object collaboration management technique 200 or any aspect thereof may be implemented in the context of the architecture and functionality of the embodiments described herein. The embedded content object collaboration management technique 200 or any aspect thereof may be implemented in any environment.

FIG. 2 illustrates one aspect pertaining to automatically replicating local changes over an embedded content object to a remotely-stored shared instance of the embedded content object. Specifically, the figure is presented to illustrate one embodiment of certain steps and/or operations for performing the foregoing automatic replication to facilitate collaboration activities over shared content objects that are embedded in other shared content objects. As can be observed, the steps and/or operations can be grouped into a set of setup operations 202 and a set of collaboration activity management operations 204.

The setup operations 202 of the embedded content object collaboration management technique 200 can commence by providing a set of executable code that constitutes a collaboration application (step 210). As used herein, a collaboration application is a computer program (e.g., comprising executable code) designed to perform a group of coordinated functions, tasks, or activities for the benefit of a user. More specifically, a collaboration application is designed to facilitate certain collaboration activities (e.g., creating, viewing, editing, sharing, etc.) over shared content objects by one or more collaborators. Instances of the executable code constituting the collaboration application are delivered for installation at one or more user devices (e.g., desktop computers, laptop computers, tablets, mobile phones, etc.) associated with one or more collaborators (step 220). Furthermore, the executable code constituting the collaboration application may be a browser with a browser plug-in to implement web-based interactions with the cloud-based storage environment, or the executable code constituting the collaboration application may be a software application that includes one or more browser components (e.g., browser extensions) to implement all or portions of web-based interactions with the cloud-based storage environment.

The collaboration activity management operations 204 of the embedded content object collaboration management technique 200 include interacting (e.g., by various collaborators) with a shared content object that has at least one embedded content object using the collaboration application at a user device (step 240). Such interactions might include opening the shared content object in the application, viewing and/or editing the shared content object, previewing the embedded content object, and/or other interactions. Another such interaction might invoke editing of the embedded content object in an editing application at the user device (step 250). For example, an "Edit" button overlay presented in the collaboration application might be clicked to open the embedded content object in a native application at the user device. Any changes to the embedded content object performed in the editing application at the user device are replicated to a remotely-stored instance of the embedded content object (step 260). As an example, the changes might be applied to an instance of the embedded object stored at a cloud-based content management system that is accessible by the user device over a network (e.g., the Internet). Access to the then-current remotely-stored instance of the embedded content object is provisioned to the user devices of the collaborators authorized for collaboration over the embedded content object. In particular, and in example embodiments, an updated embedded object (e.g., updated based on any changes to the embedded content object) that is stored at the cloud-based content management system is transmitted to one or more of the user devices, possibly including or instead of any alternative representations of the updated embedded object (step 270).

According to the foregoing steps and/or operations, any collaborator of a particular embedded content object will, at any moment in time, have access to an instance of the embedded content object that includes all then-current conflict-free changes.

One embodiment of a system, data flows, and data structures for implementing the embedded content object collaboration management technique 200 and/or other herein disclosed techniques is disclosed as follows.

Figure 3:
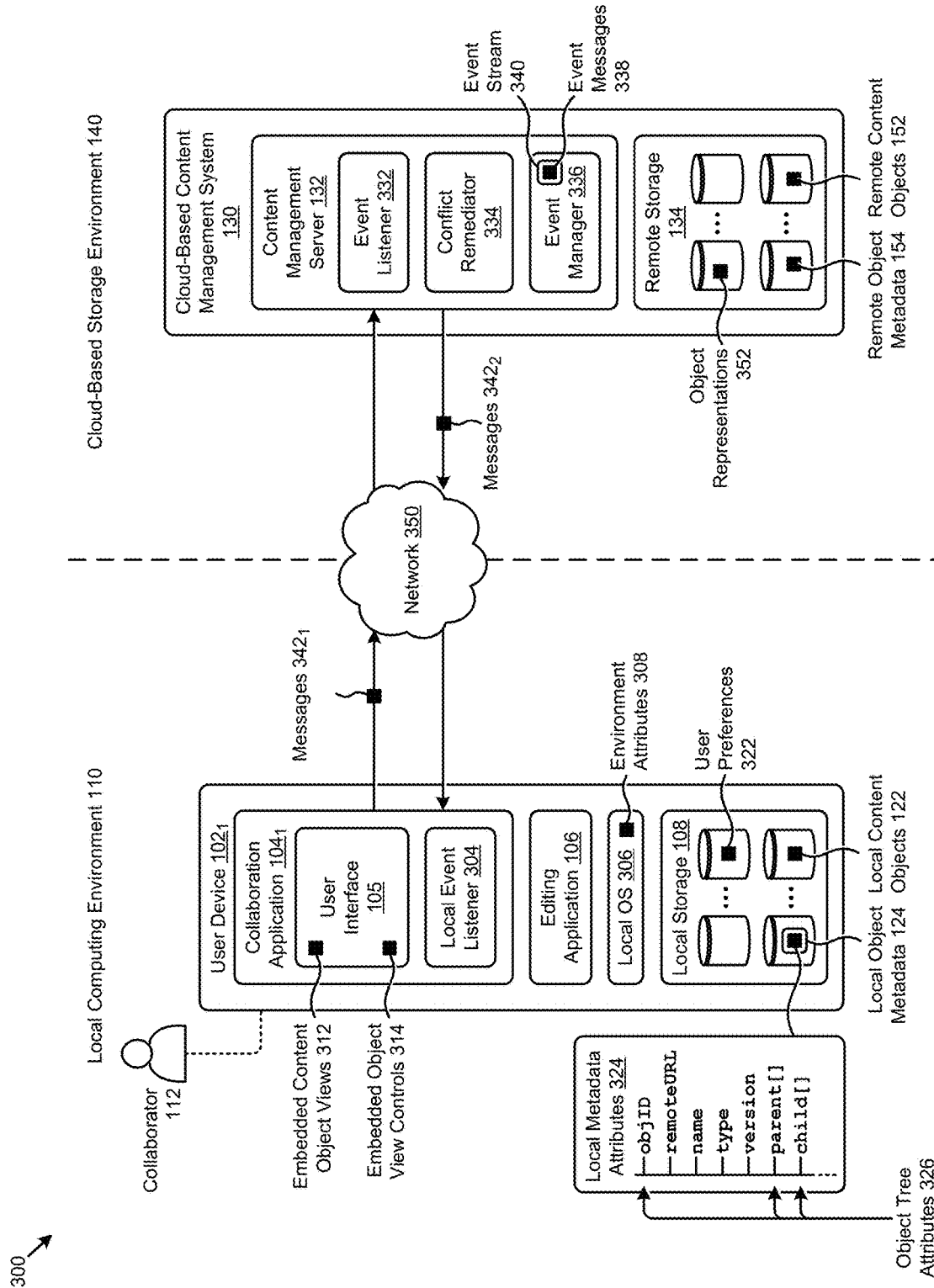
FIG. 3 is a block diagram of a system for managing collaboration activities over shared embedded content objects, according to an embodiment.

FIG. 3 is a block diagram of a system 300 for managing collaboration activities over shared embedded content objects. As an option, one or more variations of system 300 or any aspect thereof may be implemented in the context of the architecture and functionality of the embodiments described herein. The system 300 or any aspect thereof may be implemented in any environment.

FIG. 3 illustrates one aspect pertaining to automatically replicating local changes over an embedded content object to a remotely-stored shared instance of the embedded content object. Specifically, the figure is being presented to show one embodiment of certain representative components and associated data flows that describes how the herein disclosed techniques might be implemented in a computing environment that comprises a cloud-based storage environment 140 and one or more instances of a local computing environment 110. Also illustrated are various specialized data structures that improve the way a computer uses data in memory when performing steps pertaining to automatically replicating local changes over an embedded content object at local computing environment 110 to a remotely-stored shared instance of the embedded content object at cloud-based storage environment 140. The components, data flows, and data structures shown in FIG. 3 present one partitioning and associated data manipulation approach. The specific example shown is purely exemplary, and other subsystems, data structures, and/or partitioning are reasonable.

As shown, system 300 comprises several components earlier described. Specifically shown are user device 102$_1$ in local computing environment 110 and cloud-based content management system 130 in cloud-based storage environment 140. The user device 102$_1$ and local computing environment 110 represent a plurality of user devices and corresponding collaborators and local computing environments that might be associated with a particular remote (e.g., cloud-based) content management system and storage environment. As earlier described, the cloud-based content management system 130 comprises one or more instances of a content management server 132 that can access various instances of shared content objects (e.g., remote content objects 152) and associated object metadata (e.g., remote object metadata 154) stored in a set of remote storage 134. A set of object representations 352 that correspond to one or more of the remote content objects 152 are also stored in remote storage 134. Such object representations, as used herein, are visual representations of a particular content object that often consume less data than the data consumed by the underlying content object. For example, an object representation of a PowerPoint™ presentation might comprise snapshots (e.g., in PDF or JPG format) of each slide in the presentation.

Another form of an object representation is a thumbnail picture that represents a particular content object. A still further form of object representation comprises a lower resolution version of a higher resolution image, where at least a portion of metadata of the higher resolution image is included with the lower resolution image.

As further shown in system 300, an instance of a collaboration application 104$_1$ provided by the cloud-based content management system 130 is installed on user device 102$_1$ to facilitate interactions with the remote content objects 152 by collaborator 112. Various instances of local content objects 122 and local object metadata 124 that correspond to instances of remote content objects 152 and remote object metadata 154, respectively, are stored in the local storage 108 of user device 102$_1$.

As a representative scenario facilitated by the herein disclosed techniques, collaborator 112 invokes the collaboration application 104$_1$ to interact with a particular shared content object that has an embedded content object. The collaboration application 104$_1$ communicates with the content management server 132 over a network 350 to retrieve the shared content object and a preview of the embedded content object from the remote content objects 152 and the object representations 352 of the cloud-based content management system 130. The retrieved shared content object is added to the local content objects 122 and certain object metadata associated with the shared content object and/or the embedded content object might also be received and stored in the local object metadata 124. In some cases, the shared content object, the embedded content object preview, and/or any associated object metadata may be retrieved from local storage 108 rather than from the remote storage 134 of the cloud-based content management system 130.

Any of the object metadata in local object metadata 124 and/or remote object metadata 154 might be organized within data structures that facilitate fast access. As shown, such data structures for the local object metadata 124 can hold a set of local metadata attributes 324 for each respective local instance of a shared content object (e.g., embedded, not embedded, etc.). Specifically, the local metadata attributes 324 indicate that a data record (e.g., table row or object instance) for a particular content object might describe an object identifier uniquely identifying the remotely-stored instance of the content object in the cloud-based storage environment 140 (e.g., stored in an "objID" field), a URL for accessing the remotely-stored instance of the content object (e.g., stored in a "remoteURL" field), a name associated with the content object (e.g., stored in a "name" field), a description of the object type of the content object (e.g., stored in a "type" field), a version identifier associated with the content object (e.g., stored in a "version" field), a list of the object identifiers of one or more parent content objects if the content object is an embedded content object (e.g., stored in a "parent[ ]" object), a list of the object identifiers of one or more child content objects that are embedded in the content object (e.g., stored in a "child[ ]" object), and/or other attributes associated with the content object. As can be observed, the object metadata attributes stored in the "objID", "parent[ ]", and "child[ ]" fields and objects comprise a set of object tree attributes 326 that can be accessed to dynamically generate various object trees for managing the relationships between parent content objects and child (e.g., embedded) content objects.

The foregoing communications and/or other communications between the user device 102$_1$ and the cloud-based content management system 130 are facilitated at least in part by a local event listener 304 at the collaboration application 104$_1$ and an event listener 332 at the content management server 132. Each event listener can detect occurrences of messages between the local computing environment and the cloud-based storage environment (e.g., messages 342$_1$ and messages 342$_2$) that are pertinent to the then-current conditions of the environment associated with the listener. For example, the event listener 332 might listen for requests for shared content objects and embedded content object previews issued from user devices as earlier described. The local event listener 304 might detect certain messages (e.g., alerts, personal messages, etc.) pertaining to the user (e.g., collaborator 112) logged in to the collaboration application 104$_1$. More specifically, local event listener 304 might monitor the event messages 338 that are published to an event stream 340 by an event manager 336 at the content management server 132. When an event message that is pertinent to the then-current state and/or conditions of the local event listener 304 is detected, the local event listener 304 retrieves the message over network 350 for local processing. The local event listener 304 may also detect and respond to certain events that occur at the local operating system (e.g., local OS 306) of user device 102$_1$ as later discussed in further detail.

When the shared content object and the embedded content object preview are retrieved, various interactions with the shared content object and/or the embedded content object can be performed at the user interface 105 of collaboration application 104$_1$. For example, collaborator 112 might view and/or edit the shared content object. As another example, collaborator 112 might use one or more embedded object view controls 314 that overlay one or more embedded content object views 312 to navigate through various pages of the embedded content object preview. In some cases, collaborator 112 may open the embedded content object in a selected editing application for editing. The editing application 106, might be selected based at least in part on the object type of the embedded content object as identified in various object metadata (e.g., in the "type" field) associated with the embedded content object.

For example, the local object metadata might store the string "xlsx" in the "type" field associated with the embedded content object, indicating that the embedded content object can be opened in a spreadsheet editing application (e.g., Microsoft Excel) for editing. The shown editing application 106 may be a native application that is designed to be installed on user device $102_1$ to address (e.g., view, edit, save, etc.) a specific file type or file extension. In some cases, the shown editing application 106 may include a browser-based editing capability for editing an object of a specific file type. As an example, an embedded Excel workbook with file type ".xlsx" might be edited using a desktop or browser-based version of Excel, whereas an embedded image with file type ".png" might be edited using a desktop or browser-based version of an image editing application such as a "Paint" application. Selection of the editing application 106 might also be based at least in part on a set of environment attributes 308 and/or a set of user preferences 322 at user device $102_1$. For example, the user preferences 322 might indicate that Google Sheets is to be used to open an "xlsx" workbook if a native installation of Excel is not present, the presence of which can be determined from the environment attributes 308. When the editing application is selected, a then-current remotely-stored instance of the embedded content object is retrieved from the cloud-based content management system 130 for editing.

When collaborator 112 saves any changes to the embedded content object from the editing application 106, local event listener 304 detects the save at the local OS 306 and publishes the changes and/or the updated document to the cloud-based content management system 130 over network 350. The changes can be published to the cloud-based content management system 130 over network 350 by sending a complete copy of the embedded content object, or the changes can be published to the cloud-based content management system 130 by sending just the changes to be applied at the cloud-based content management system. In some cases, the changes are codified as operational transform (OT) messages. In some cases, multiple changes that are codified as multiple operational transform messages can be remediated at the cloud-based content management system.

The published changes are detected by event listener 332 at the cloud-based content management system 130 and applied to a remotely-stored instance of the embedded content object in remote storage 134. In some cases, the changes to the embedded content object will result in one or more updates to certain version identifiers and/or certain instances of the object representations 352 associated with the embedded content object. Such updates are codified in various instances of event messages 338 that are detected by collaboration application $104_1$. As an example, an event message indicating that a new preview is available for an embedded content object that is currently being viewed in collaboration application $104_1$ will be detected and the new preview will be retrieved for presentation in the user interface 105 of the application.

In environments where multiple collaborators work asynchronously on various shared content objects, including embedded content objects, it is possible for conflicts to arise. In the embodiment of FIG. 3, remediation of conflicts between embedded content objects and/or other shared content objects can be facilitated at least in part by a conflict remediator 334 at content management server 132. In other embodiments, an instance of a conflict remediator might be implemented in the collaboration application to operate independently from or in conjunction with the conflict remediator 334. As an example, if conflict remediator 334 at content management server 132 detects two conflicting operations to be applied over a single content object, the conflict remediator will order the operations appropriately and apply version identifiers as needed. In some cases, conflict remediator 334 might generate actions, messages and/or events associated with the cloud-based storage environment 140 and/or the various local computing environments in response to the detected conflicts. Specifically, the conflict remediator might reconcile the information (e.g., versions, object changes, etc.) received from the local computing environment 110 to deliver (e.g., broadcast) the reconciled information to the various user devices of the relevant collaborators using aspects of event messages 338 and/or aspects of messages between the local computing environment and the cloud-based storage environment.

For example, a message between the local computing environment and the cloud-based storage environment (e.g., messages $342_2$) might include object metadata updates and/or content object updates and/or object representation updates to be received at the user devices by respective instances of the collaboration application. Instances of such asynchronous updates can be received locally by the local event listener operating at the collaboration application of user device $102_1$. This approach allows each collaborator to work asynchronously (e.g., independently) on various shared content, yet receive low latency (e.g., near real time) updates pertaining to operations performed by other collaborators in a respective instance of the local computing environment 110.

Further details regarding general approaches to low-latency signaling of asynchronous cloud-based content management operations among collaborators are described in U.S. application Ser. No. 15/140,179 titled "Virtual File System for Cloud-Based Shared Content", filed on Apr. 27, 2016, which is hereby incorporated by reference in its entirety.

The foregoing discussions include techniques for interacting with a shared content object that has at least one embedded content object (e.g., step 240 of FIG. 2), which techniques are disclosed in further detail as follows.

Figure 4:
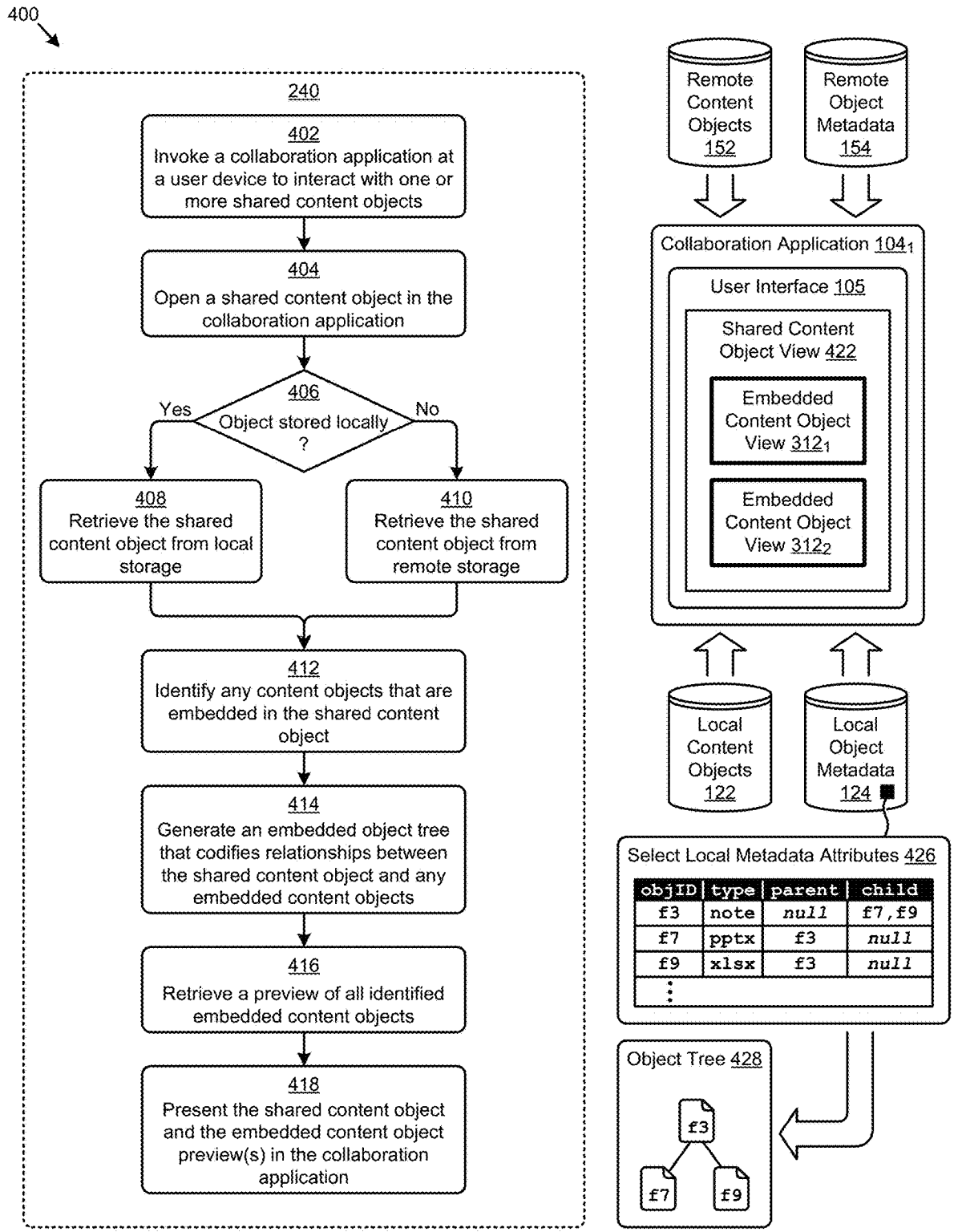
FIG. 4 presents a shared content object access technique as implemented in systems that manage collaboration activities over shared embedded content objects, according to an embodiment.

FIG. 4 presents a shared content object access technique 400 as implemented in systems that manage collaboration activities over shared embedded content objects. As an option, one or more variations of shared content object access technique 400 or any aspect thereof may be implemented in the context of the architecture and functionality of the embodiments described herein. The shared content object access technique 400 or any aspect thereof may be implemented in any environment.

FIG. 4 illustrates one aspect pertaining to automatically replicating local changes over an embedded content object to a remotely-stored shared instance of the embedded content object. Specifically, the figure is presented to illustrate one embodiment of certain steps and/or operations that facilitate interacting (e.g., by various collaborators) with a shared content object that has at least one embedded content object using a collaboration application at a user device. A representative scenario is also shown in the figure to illustrate an example application of the shared content object access technique 400.

The shared content object access technique 400 can commence by invoking a collaboration application at a user device to interact (e.g., create, edit, view, etc.) with one or more shared content objects (step 402). For example, a collaboration application $104_1$ having a user interface 105 might be invoked by a collaborator. A shared content object is then opened in the collaboration application (step 404). In some cases, strictly as an optional configuration, the user device has storage areas for holding files. In such cases a shared content object might be stored at the user device. Given this option, there are various tests underlying decision 406 that are executed to determine whether or not the shared content object is stored locally at the user device (see "Yes" path of decision 406). If so, then the shared content object is retrieved from local storage at the user device (step 408). In this case, the shared content object might be retrieved from the set of local content objects 122 at the user device, and any object metadata associated with the shared content object might accessed at local object metadata 124 stored at the user device. If the shared content object is not stored locally to the user device (see "No" path of decision 406), then the shared content object is retrieved from a remote storage location (step 410). As an example, the shared content object might be retrieved in this case from the set of remote content objects 152 at a cloud-based content management system, and any object metadata associated with the shared content object might be accessed at remote object metadata 154 stored at the cloud-based content management system.

Any embedded content objects that are associated with the shared content object are identified (step 412). The embedded content objects can often be identified from the object metadata associated with the shared content object. As indicated in a set of select local metadata attributes 426 from local object metadata 124, for example, a shared content object identified as "f3" is a parent content object of two child or embedded content objects identified as "f7" and "f9". According to the structure depicted in the select local metadata attributes 426, multiple hierarchical levels of embedding are possible (e.g., one or more embedded content objects can be embedded in other embedded content objects, and so on in a hierarchical manner).

An object tree that codifies the relationships between the identified embedded content object(s) and the shared content object is generated (step 414). The object tree is often derived from the object metadata associated with the shared content object and/or its embedded content objects. As an example, the logical representation of an object tree 428 derived from the select local metadata attributes 426 is shown in FIG. 4. Such object trees can facilitate certain aspects pertaining to embedded content object collaboration management, such as versioning of the content objects comprising a tree in the presence of changes to any one or more of the content objects.

When the embedded content objects associated with the shared content object are identified, previews of all identified embedded content objects are retrieved (step 416). The shared content object and the embedded content object previews are then presented in the collaboration application (step 418). As an example, the shared content object "f3" might be presented in a shared content object view 422 at user interface 105, and the previews of the two embedded content objects "f7" and "f9" associated with object "f3" might be presented in embedded content object view $312_1$ and embedded content object view $312_2$.

The foregoing discussions include techniques for editing an embedded content object in an edition application at a user device (e.g., step 250 of FIG. 2), which techniques are disclosed in further detail as follows.

Figure 5:
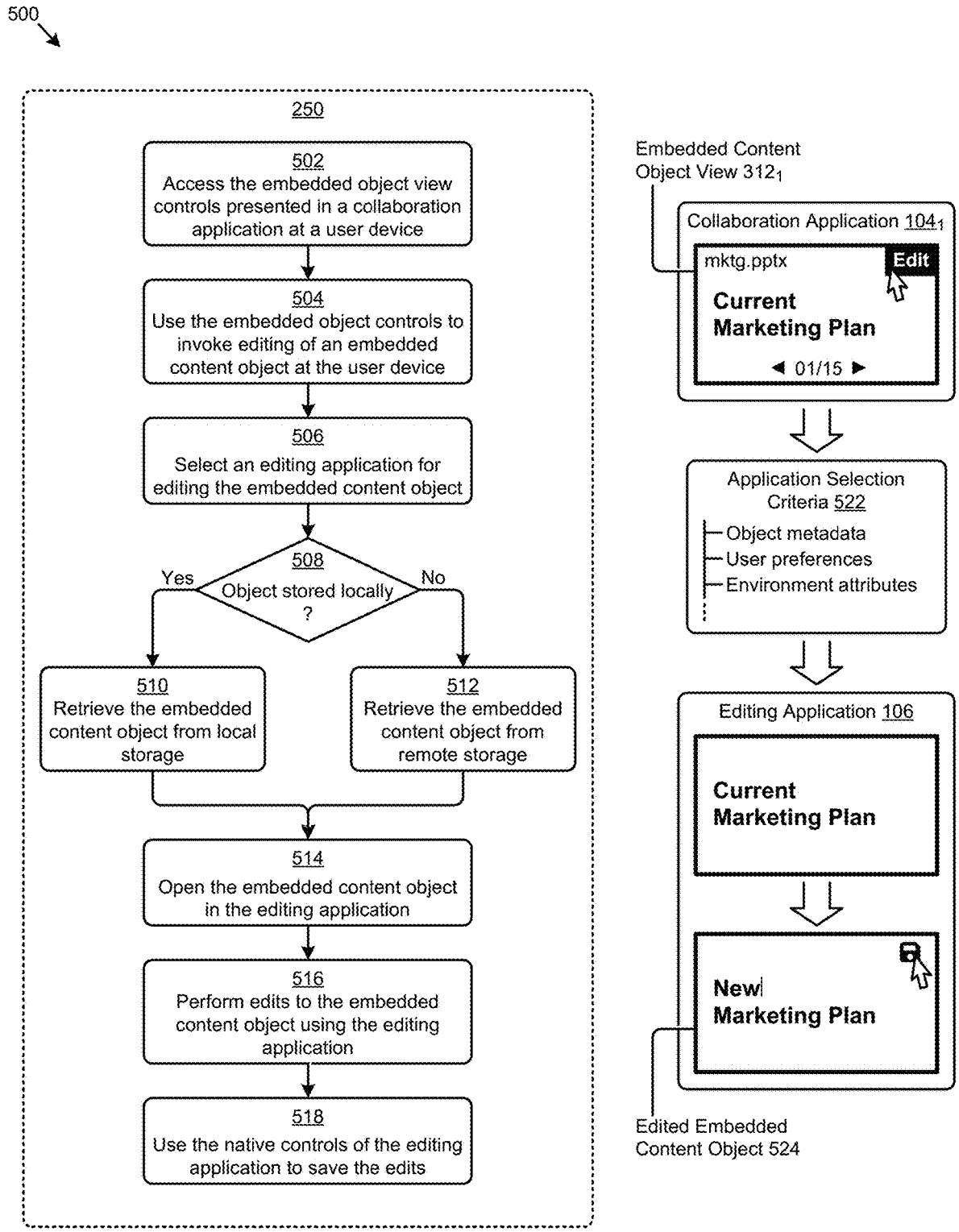
FIG. 5 depicts an embedded content object editing technique as implemented in systems that facilitate managing collaboration activities over shared embedded content objects, according to an embodiment.

FIG. 5 depicts an embedded content object editing technique 500 as implemented in systems that facilitate managing collaboration activities over shared embedded content objects. As an option, one or more variations of embedded content object editing technique 500 or any aspect thereof may be implemented in the context of the architecture and functionality of the embodiments described herein. The embedded content object editing technique 500 or any aspect thereof may be implemented in any environment.

FIG. 5 illustrates one aspect pertaining to automatically replicating local changes over an embedded content object to a remotely-stored shared instance of the embedded content object. Specifically, the figure is presented to illustrate one embodiment of certain steps and/or operations that facilitate editing an embedded content object in an edition application at a user device. A representative scenario is also shown in the figure to illustrate an example application of the editing an embedded content object in an edition application at a user device.

Editing an embedded content object in an editing application at a user device can commence by accessing the embedded object view controls presented in a collaboration application at a user device (step 502). As illustrated in embedded content object view $312_1$ of collaboration application $104_1$, such embedded object view controls might comprise preview page navigation controls, an "Edit" button, and/or other controls. Using the embedded object view controls (e.g., the "Edit" button), editing of an embedded content object may be invoked at the user device (step 504). For example, a user (e.g., collaborator) might click the "Edit" button to open the "mktg.pptx" document for editing. Alternatively, or in addition to the foregoing, a user might click on a comment button to add a comment to the embedded document. Also, alternatively or in addition to the foregoing, a user might use other screen devices (e.g., buttons, menus, etc.) to add an annotation to the embedded document, and/or might use still other screen devices to initiate other collaboration activities that are associated with, or pertain to, the embedded document.

At step 506, an editing application for editing the embedded content object is selected. As shown in a set of application selection criteria 522, the selection of the editing application might be based at least in part on one or more object metadata attributes (e.g., attributes object type), one or more user preferences (e.g., preferences describing default applications), or one or more environment attributes (e.g., attributes describing installed applications). Strictly as an example, if the metadata attributes indicate that the embedded content object is a file that can be downloaded to the user's device, then such a download may be automatically initiated. Strictly as another example, if the metadata attributes indicate that the embedded content object refers to an object (e.g., a weblink) that is managed by a cloud-based application (e.g., by Google Docs), then the object is accessed using the capabilities provided by reference to the object (e.g., the weblink). In some situations, the screen devices (e.g., buttons, menus, etc.) used to initiate activities on the embedded document might indicate an "Edit" operation, even though the operations that take place after the user activates the screen device do not include any actual "Edit" operations. Some of the determinations made during performance of step 506 establish whether or not the embedded item is of a nature that a corresponding content object (e.g., a document) can be and/or has been downloaded to the user device.

As such, if the embedded content object is stored locally on the user device (see "Yes" path of decision 508), then the embedded content object is retrieved from local storage at the user device (step 510). If the embedded content object is not stored locally at the user device (see "No" path of decision 508), and if the embedded item is of a nature that a corresponding content object can be and/or should be downloaded to the user device, then the embedded content object is retrieved from a remote storage location (step 512). In this case, the embedded content object might be retrieved from a cloud-based content management system along with any object metadata associated with the embedded content object. The embedded content application is then opened in the editing application (step 514) and various edits are performed on the embedded content object (step 516). For example, the title of the embedded "mktg.pptx" document might be changed from "Current Marketing Plan" to "New Marketing Plan" using editing application 106, producing an edited embedded content object 524. The native controls of the editing application (e.g., a save icon at editing application 106) are used to save the edits to the embedded content object (step 518).

The foregoing discussions include techniques for replicating the foregoing changes to the embedded content object at a remotely-stored instance of the embedded content object for access by various collaborators (e.g., step 260 and step 270 of FIG. 2), which techniques are disclosed in further detail as follows.

Figure 6:
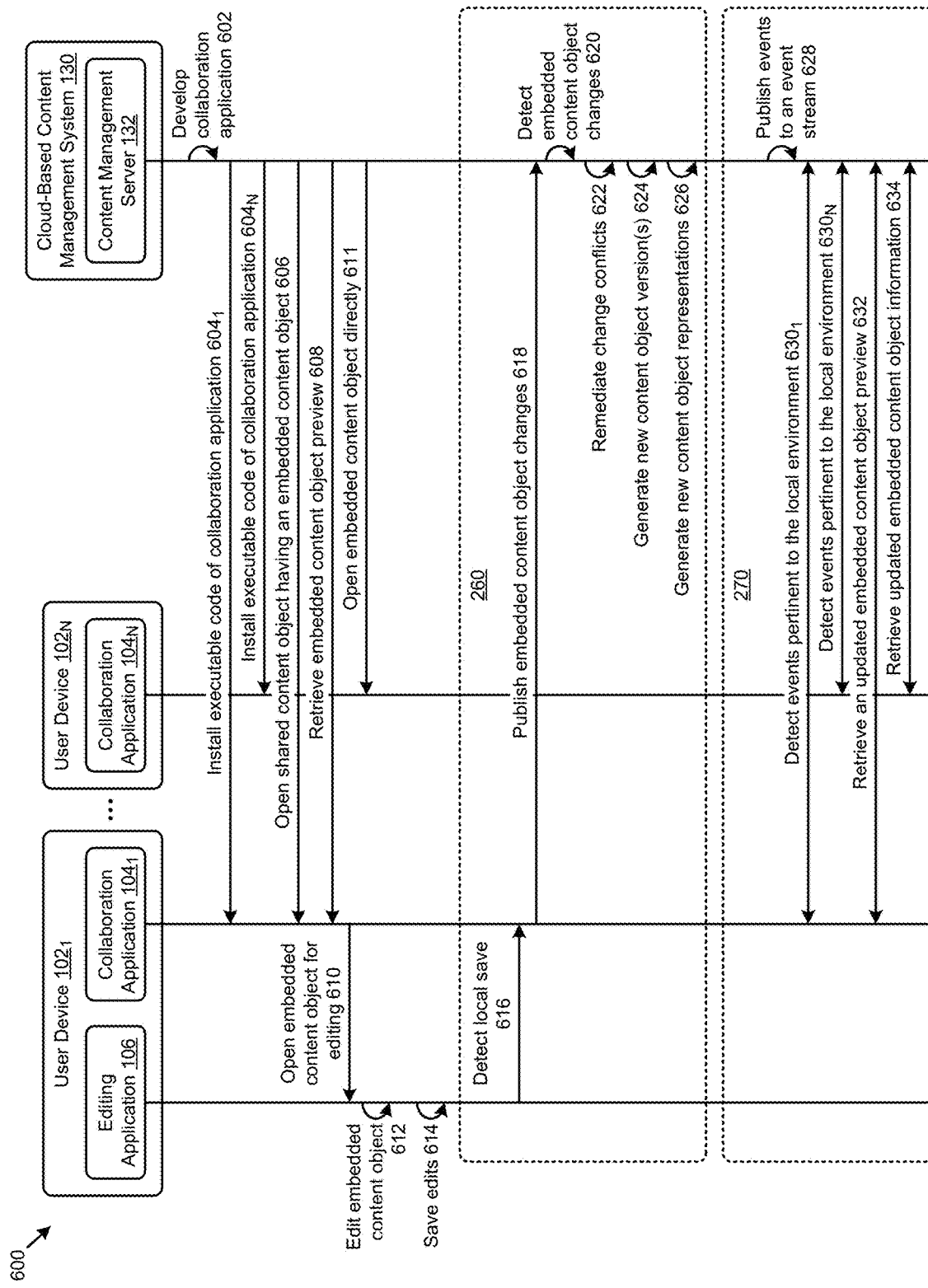
FIG. 6 illustrates an embedded content object collaboration management scenario as performed in systems that facilitate managing collaboration activities over shared embedded content objects, according to an embodiment.

FIG. 6 illustrates an embedded content object collaboration management scenario 600. As an option, one or more variations of embedded content object collaboration management scenario 600 or any aspect thereof may be implemented in the context of the architecture and functionality of the embodiments described herein. The embedded content object collaboration management scenario 600 or any aspect thereof may be implemented in any environment.

FIG. 6 illustrates one possible embodiment pertaining to automatically replicating local changes over an embedded content object to a remotely-stored shared instance of the embedded content object. Specifically, the figure is being presented to illustrate a representative embedded content object collaboration scenario comprising high order interactions (e.g., operations, messages, etc.) exhibited by various computing components earlier described and facilitated by the herein disclosed techniques. The particular computing components shown in FIG. 6 are the cloud-based content management system 130 comprising the content management server 132, and the user device $102_1$ comprising an instance of the collaboration application $104_1$ and the editing application 106. Also shown is a second instance of a user device (e.g., user device $102_N$) comprising the collaboration application (e.g., collaboration application $104_N$) to represent the N collaborators that might be collaborating over a particular embedded content object.

In this embodiment, the scenario commences upon developing (e.g., using a server of the cloud-based content management system) a set of executable code that constitutes a collaboration application as described herein (operation 602). The executable code is then installed at each of the user devices (message $604_1$ and message $604_N$). For example, a collaborator associated with a user device might use a browser to address an access point (e.g., via a uniform resource location (URL)) for requesting a download and installation of the collaboration application.

The foregoing describes a scenario where a particular set of executable code is downloaded to the client device. However, in some embodiments, a client device might be configured with a browser and any needed browser plug-ins, as well as a complement of native applications such that a download of the executable code is not needed. For example, the client device might be preconfigured with a suite of browser-based editing applications plus an executable copy of Microsoft Excel, Microsoft PowerPoint, an image editing application, etc.

Following configuration of the user devices, a shared content object that comprises an embedded content object is opened in the collaboration application at user device $102_1$ (operation 606). In response to opening the shared content object, a preview of the embedded content object is retrieved by collaboration application $104_1$ (message 608). A collaborator at user device $102_1$ might then open the embedded content object for editing in editing application 106 (message 610). At some other time, a collaborator at user device $102_N$ might open the embedded content object directly in collaboration application $104_N$ (message 611). As can be observed, the embedded content object might be edited (operation 612) and the edits saved (operation 614) at user device $102_1$.

According to the herein disclosed techniques, the foregoing local save operation associated with editing application 106 is detected by collaboration application $104_1$ (message 616). In response to detecting the save operation, the changes to the embedded content object at user device $102_1$ are published (message 618). The published changes are detected at content management server 132 (operation 620) and any then-current conflicts associated with the changes and/or the underlying embedded content object are remediated (operation 622). A new version for at least the embedded content object is generated (operation 624). Generating a new version might comprise storing an updated copy of the embedded content object that comprises the published changes, and/or an updated set of the object metadata associated with the embedded content object at the cloud-based content management system 130.

In some cases, new versions might be generated for other content objects related to the embedded content object. For example, the version indicator of the parent content object of the embedded content object might be updated in response to the change in its embedded content. Certain object representations associated with the embedded content object might be generated based at least in part on the changes performed at user device $102_1$ (operation 626).

The content management server 132 will publish various event messages that correspond to the replication activities performed in response to detecting the changes to the embedded content object (operation 628). The event messages pertinent to each local environment are detected by the collaboration applications at the user devices (message $630_1$ and message $630_N$). For example, since the collaboration application $104_1$ has a preview of the embedded content object open for viewing, it might retrieve a newly generated preview of the embedded content object to present at user device $102_1$ (message 632). As another example, since the collaboration application $104_N$ has the embedded content object open for direct interaction, a newly generated preview and/or other information pertaining to the embedded content object might be obtained (message 634).

FIG. 7A, FIG. 7B, FIG. 7C, FIG. 7D, FIG. 7E, FIG. 7F, FIG. 7G, and FIG. 7H present various collaboration application views of a usage scenario 700 that occurs in systems that facilitate managing collaboration activities over shared content objects that are embedded in other shared content objects. As an option, one or more variations of usage scenario 700 or any aspect thereof may be implemented in the context of the architecture and functionality of the embodiments described herein. The usage scenario 700 or any aspect thereof may be implemented in any environment.

FIG. 7A through FIG. 7H illustrate aspects pertaining to automatically replicating local changes over an embedded content object to a remotely-stored shared instance of the embedded content object. Specifically, the figures are being presented to illustrate various user interface views of a collaboration application that facilitates collaboration activities over embedded content objects.

Figure 7A:
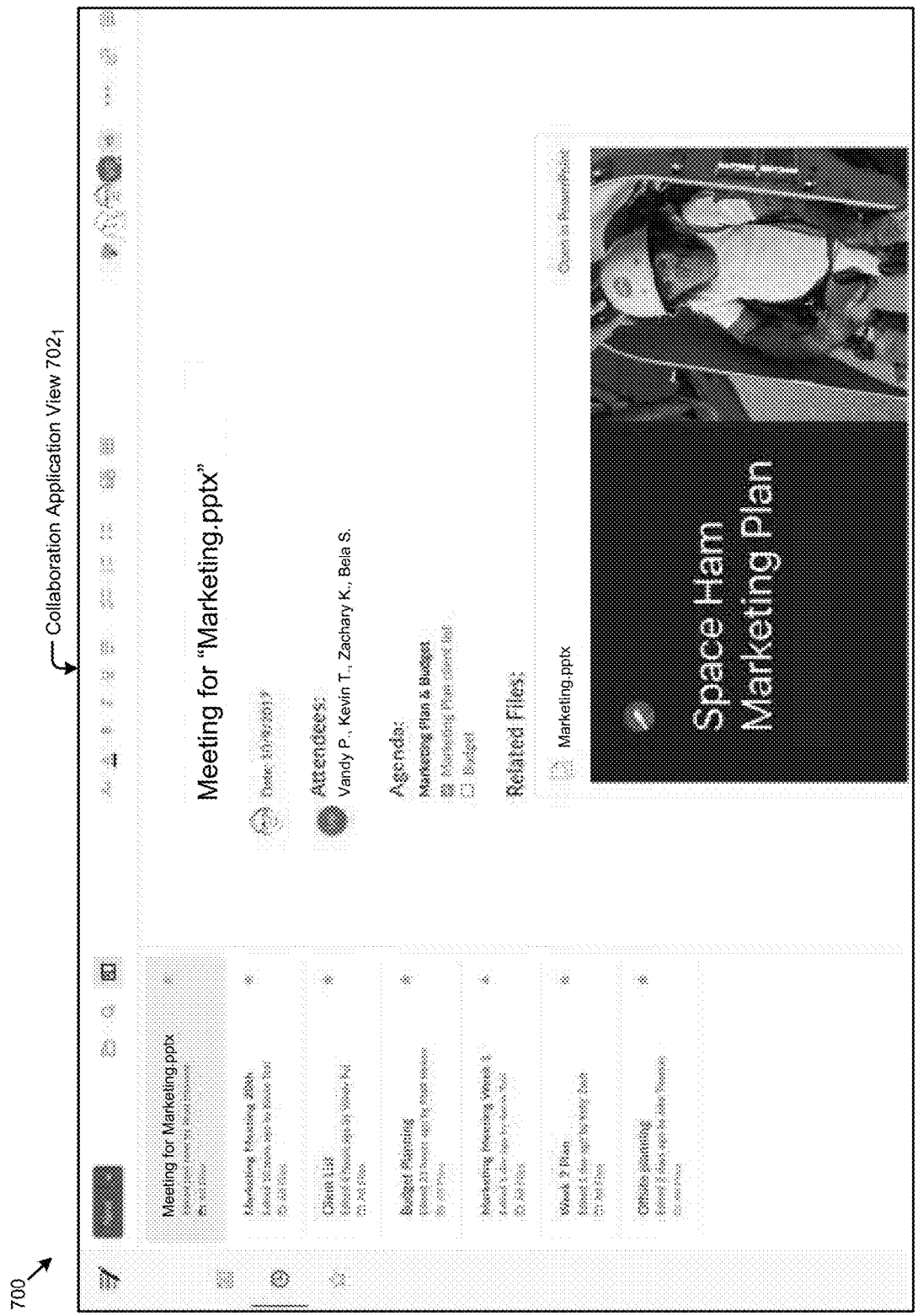
FIG. 7A, FIG. 7B, FIG. 7C, FIG. 7D, FIG. 7E, FIG. 7F, FIG. 7G, and FIG. 7H present various collaboration application views of a usage scenario that occurs in systems that facilitate managing collaboration activities over shared content objects that are embedded in other shared content objects, according to an embodiment.

FIG. 7A depicts a collaboration application view $702_1$ showing a presentation document that is embedded into a meeting invitation. As depicted, a presentation or other document can be embedded in the collaboration application configuration detail view.

Figure 7B:
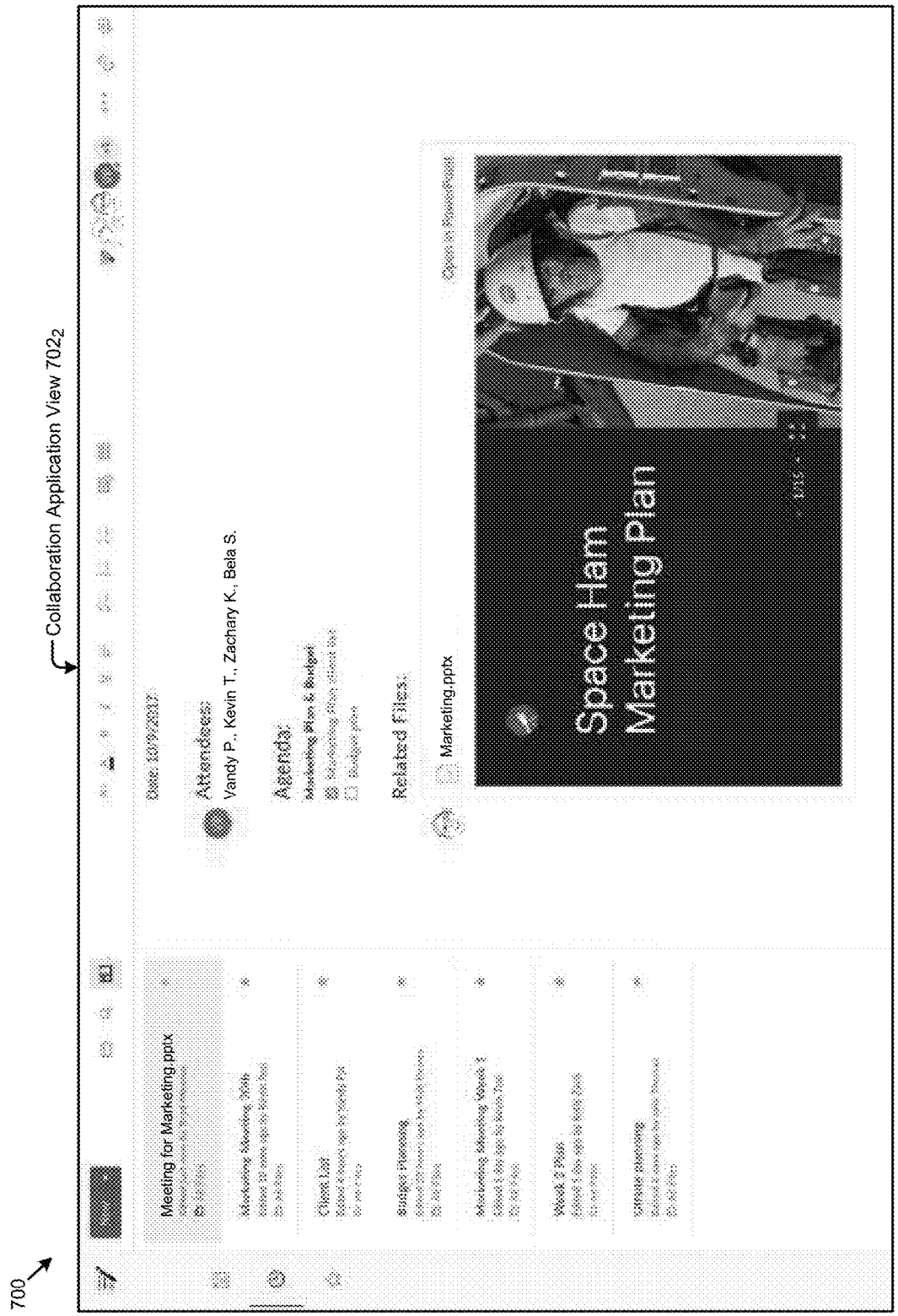

FIG. 7B depicts a collaboration application view $702_2$ showing a document being embedded into a meeting invitation. As depicted, a presentation or other document can be embedded into the collaboration application configuration detail view. A preview can be displayed whenever the meeting invitation view is visible.

Figure 7C:
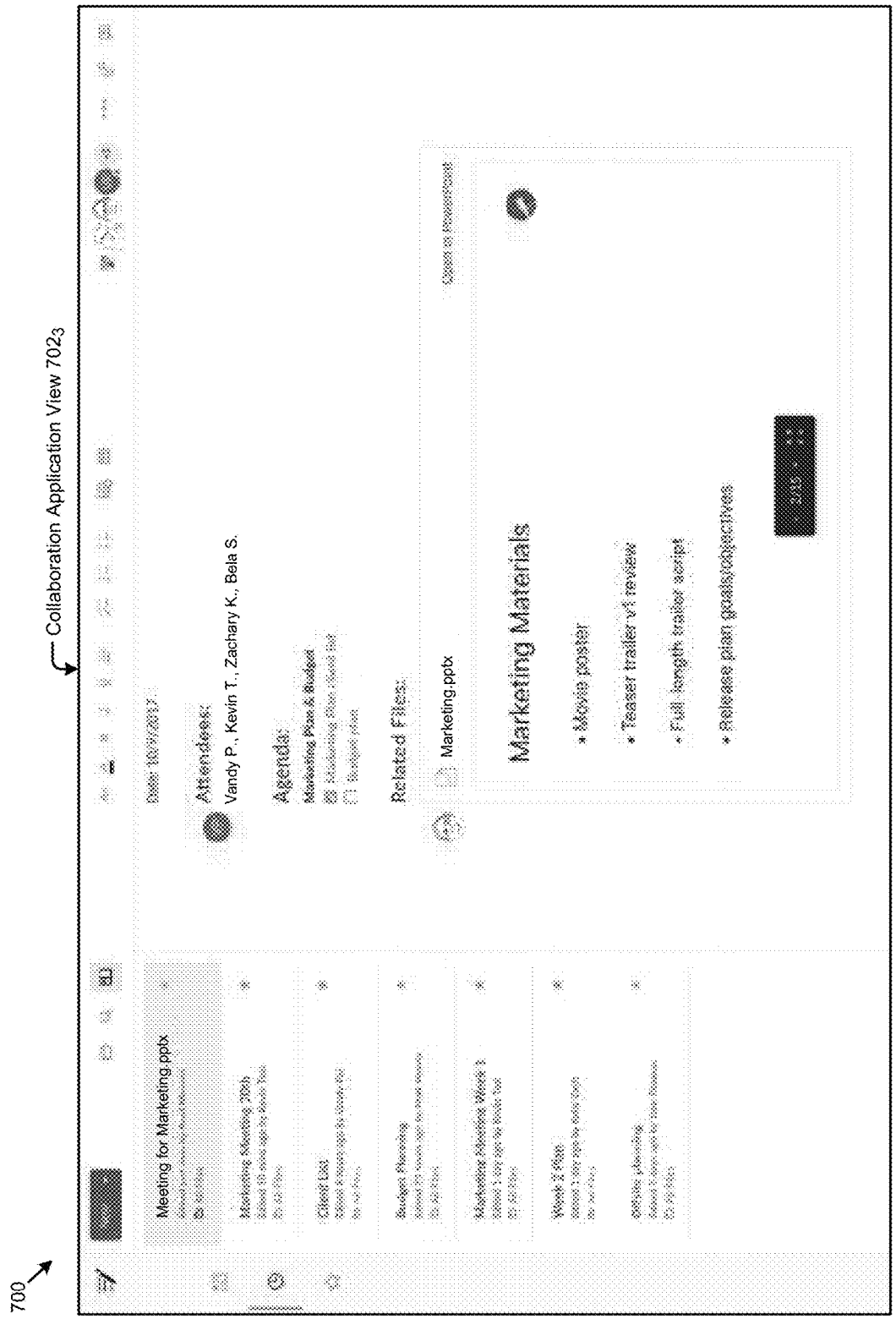

FIG. 7C depicts a collaboration application view $702_3$ showing an embedded document preview with navigation controls. The embedded document has embedded object view controls (e.g., the embedded navigation control that indicated page 2 of 15) which can be operated by the user at will. Alternatively, the embedded document can be opened using a native application.

Figure 7D:
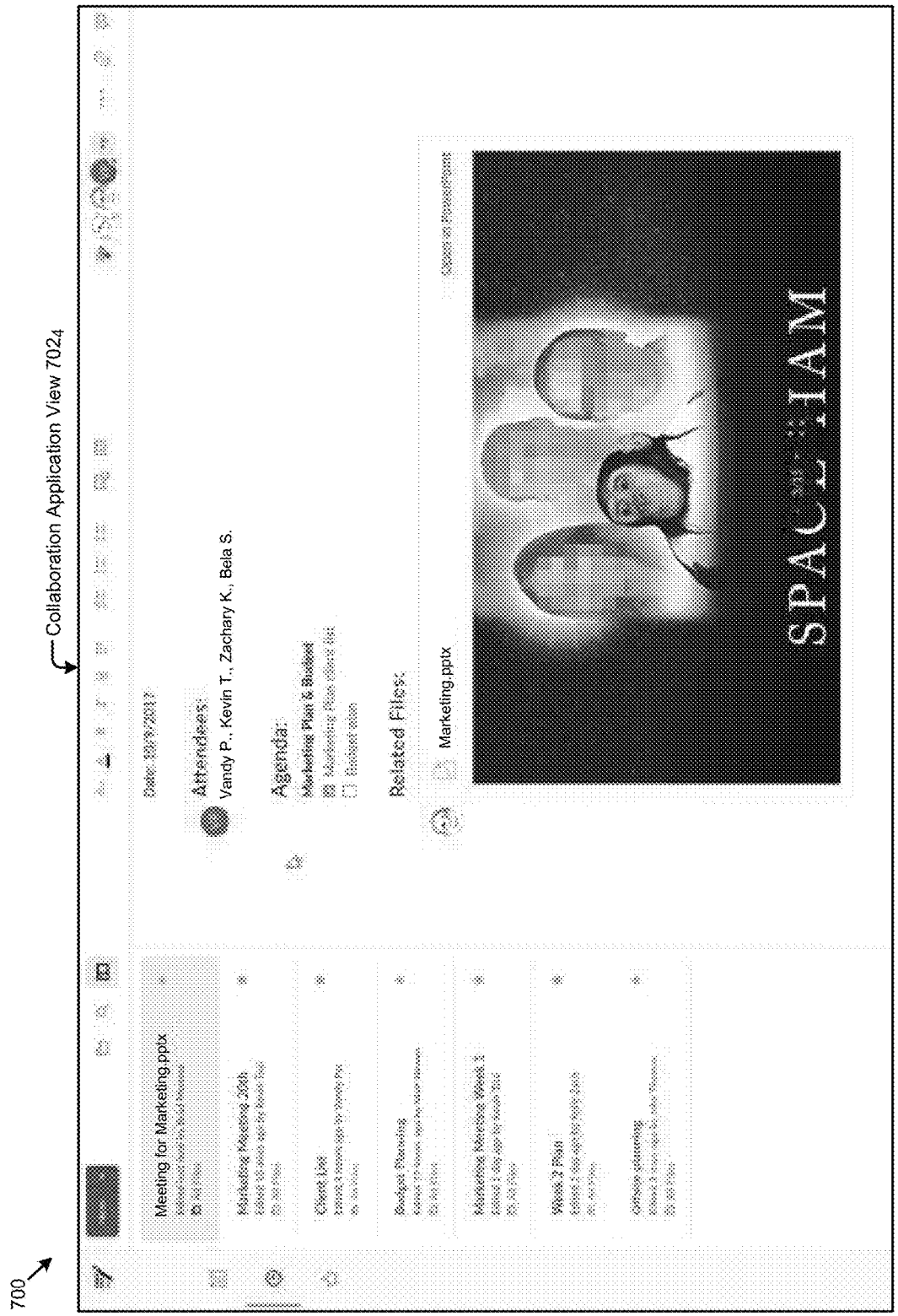

FIG. 7D depicts a collaboration application view $702_4$ showing an embedded document with an option for opening via a native productivity application (e.g., the "Open in PowerPoint" indication, as shown. When the embedded document is opened using a native application, it is opened using a shared version of the embedded document that is shared by all collaborators (e.g., invitees).

Figure 7E:
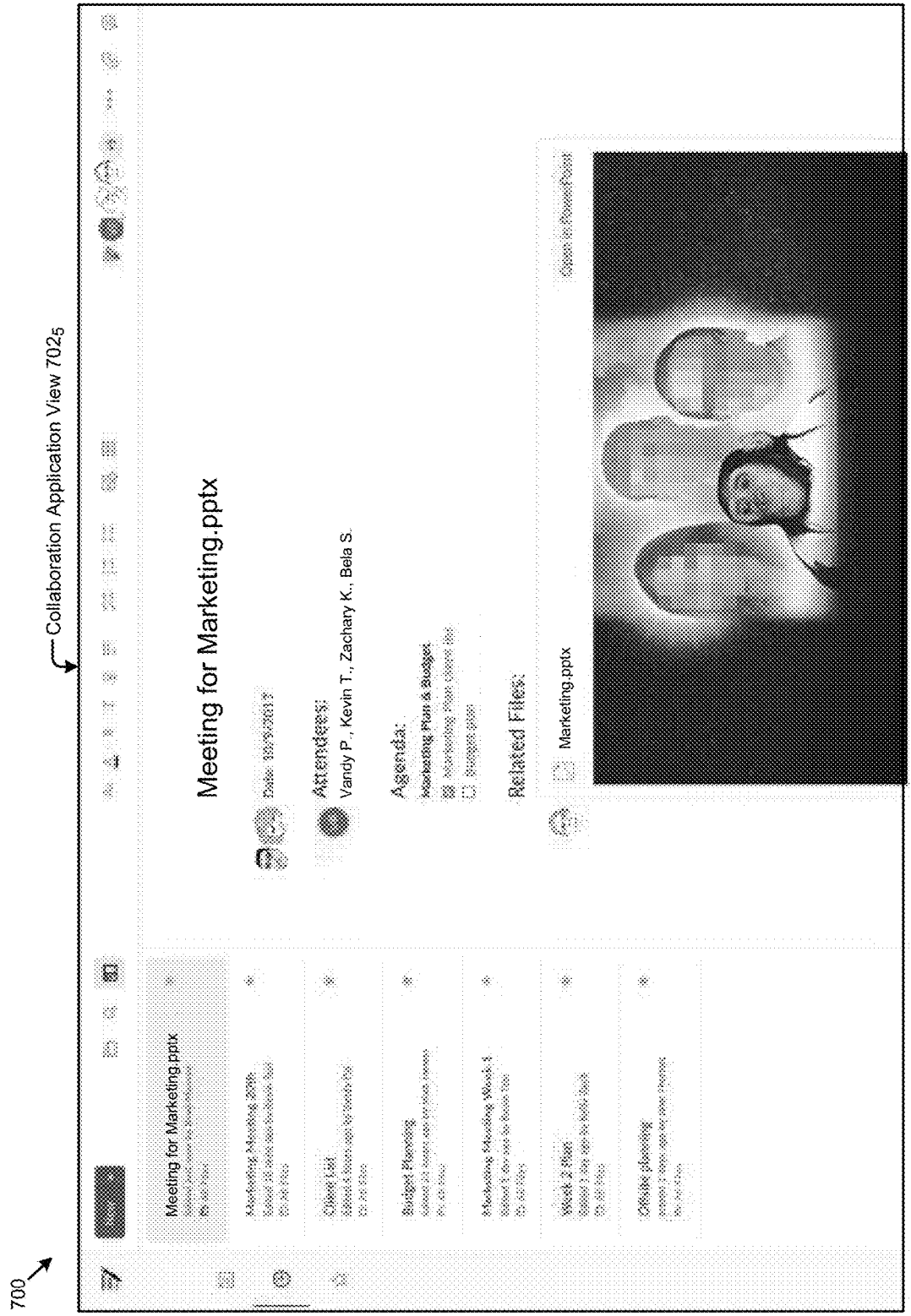

FIG. 7E depicts a collaboration application view $702_5$ showing an indication of the collaborators (e.g., invitees) who are viewing a document that is embedded within a meeting reminder notice. When the embedded document is opened using a native application that is shared by all collaborators (e.g., invitees), the users who currently have the document open are indicated in the shared meeting reminder view. Specifically, the invitees' avatars are displayed next to the date.

Figure 7F:
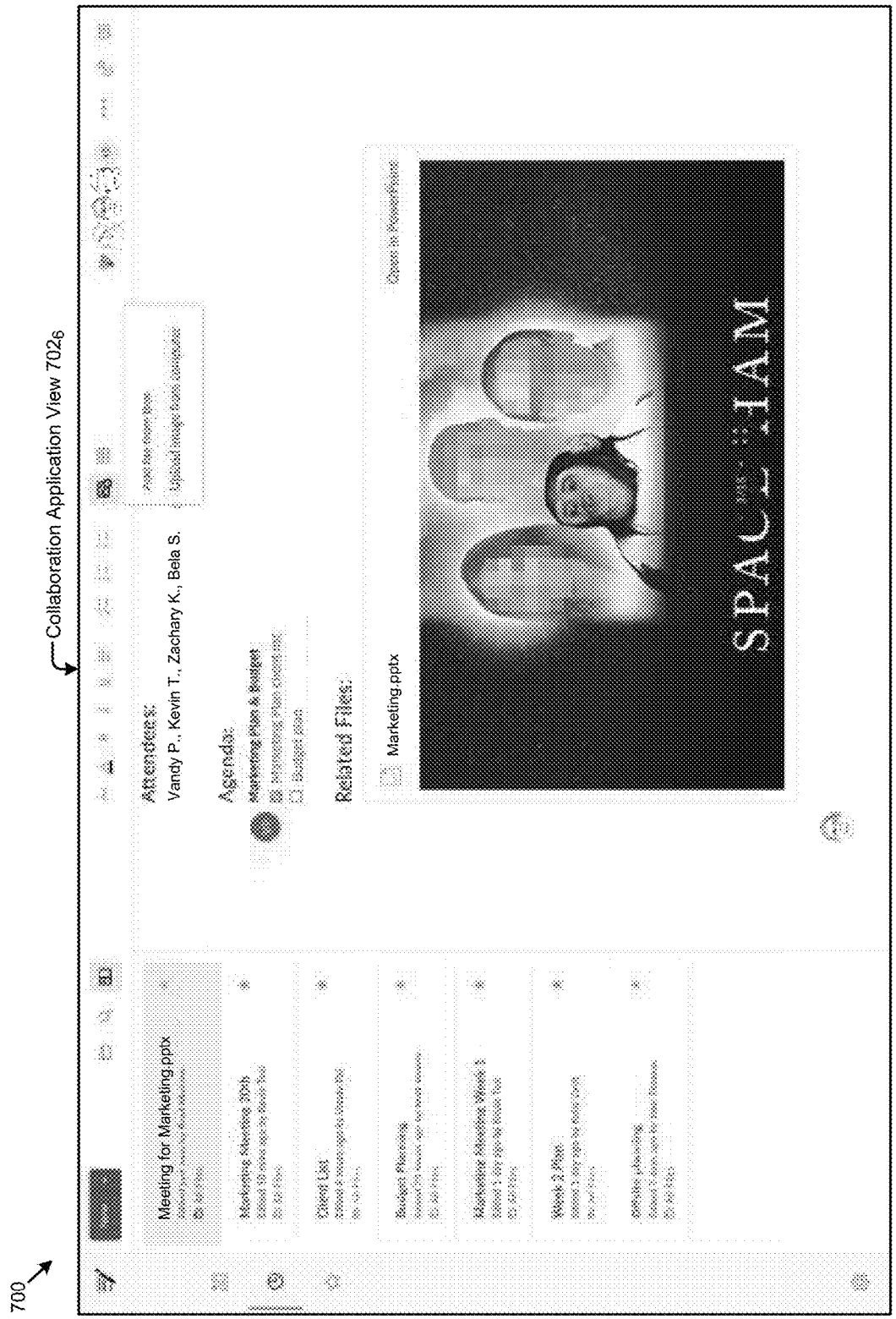

FIG. 7F depicts a collaboration application view $702_6$ showing a widget for adding an embedded document to a meeting invitation. The embodiment of FIG. 7F includes a widget to add additional embedded files to be shared. As shown, the widget for adding an embedded document to a meeting invitation offers alternatives. One alternative to embedding a file from a shared repository is to upload a file from the user's local computer. A dialog box for picking an embedded document from a repository is presented.

Figure 7G:
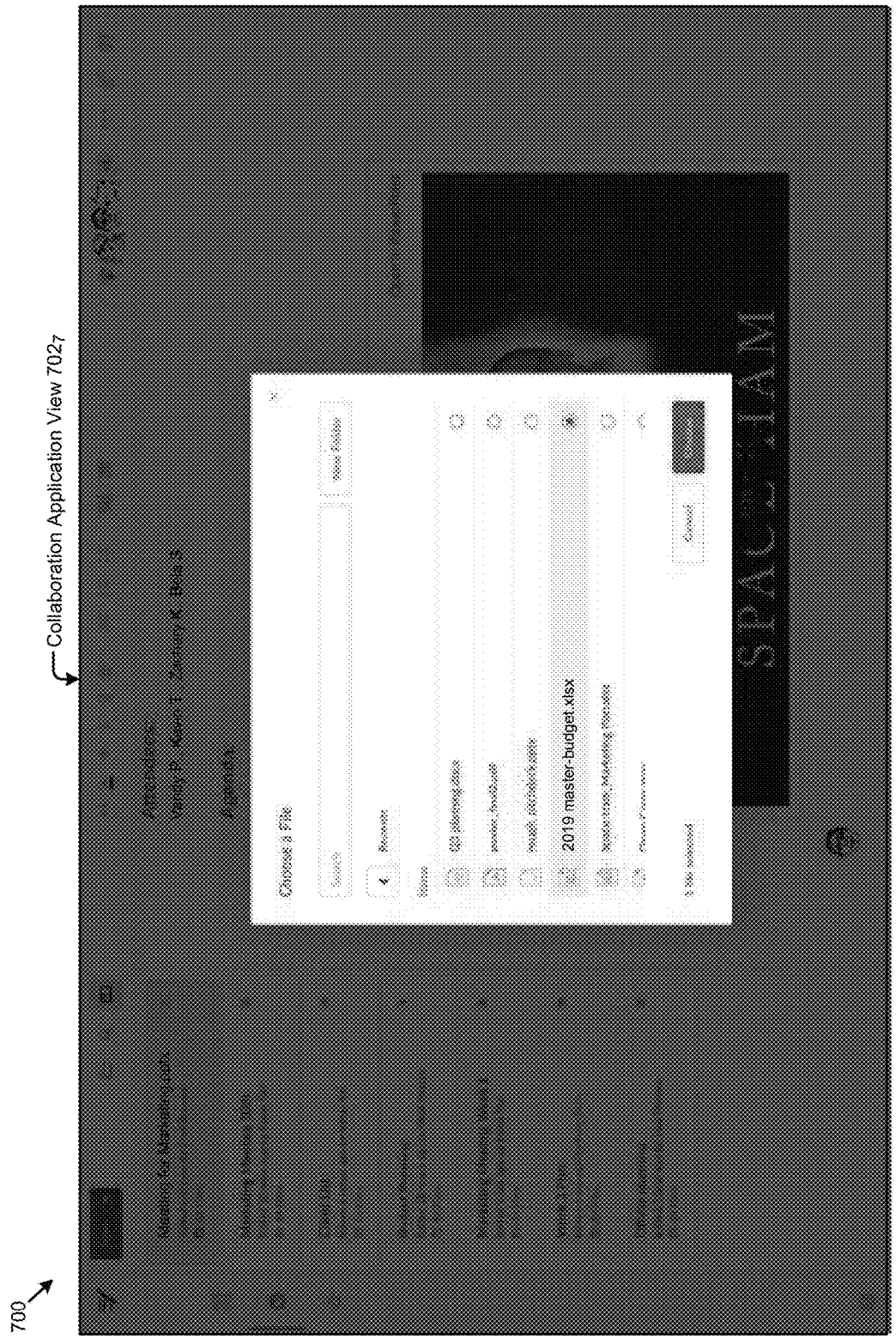

FIG. 7G depicts a collaboration application view $702_7$ showing a widget for picking an embedded document from a repository. A dialog box for picking an embedded document from a repository might include a listing (as shown), or an array of icons, or an arrangement of thumbnail images, etc. Such a dialog box provides one or more mechanisms for picking a document of any type.

Figure 7H:
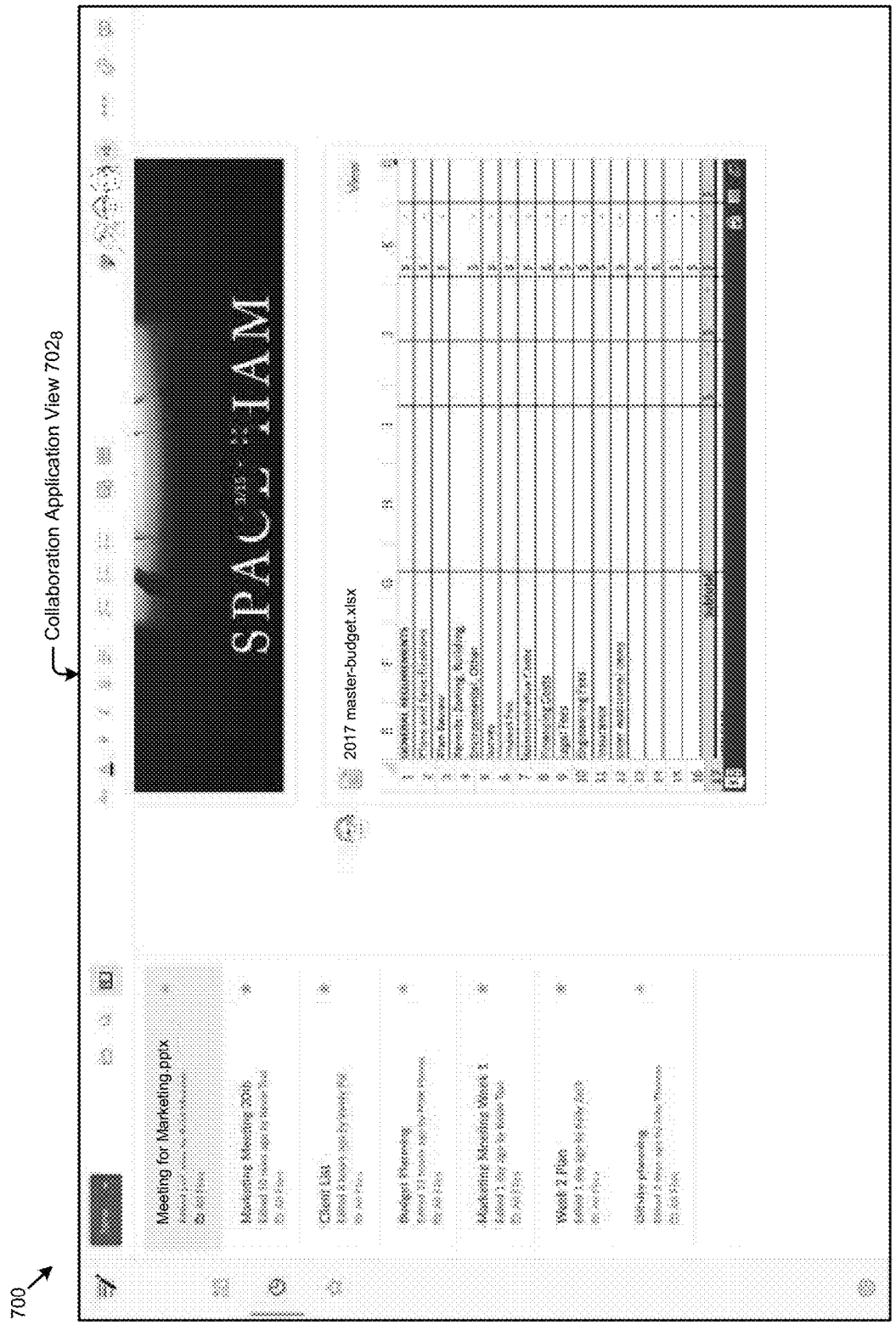

As shown in the collaboration application view $702_8$ of FIG. 7H, a spreadsheet document can be embedded. Navigation controls may be different depending on the document type. A depiction of the owner of the document is also displayed.

Figure 8A:
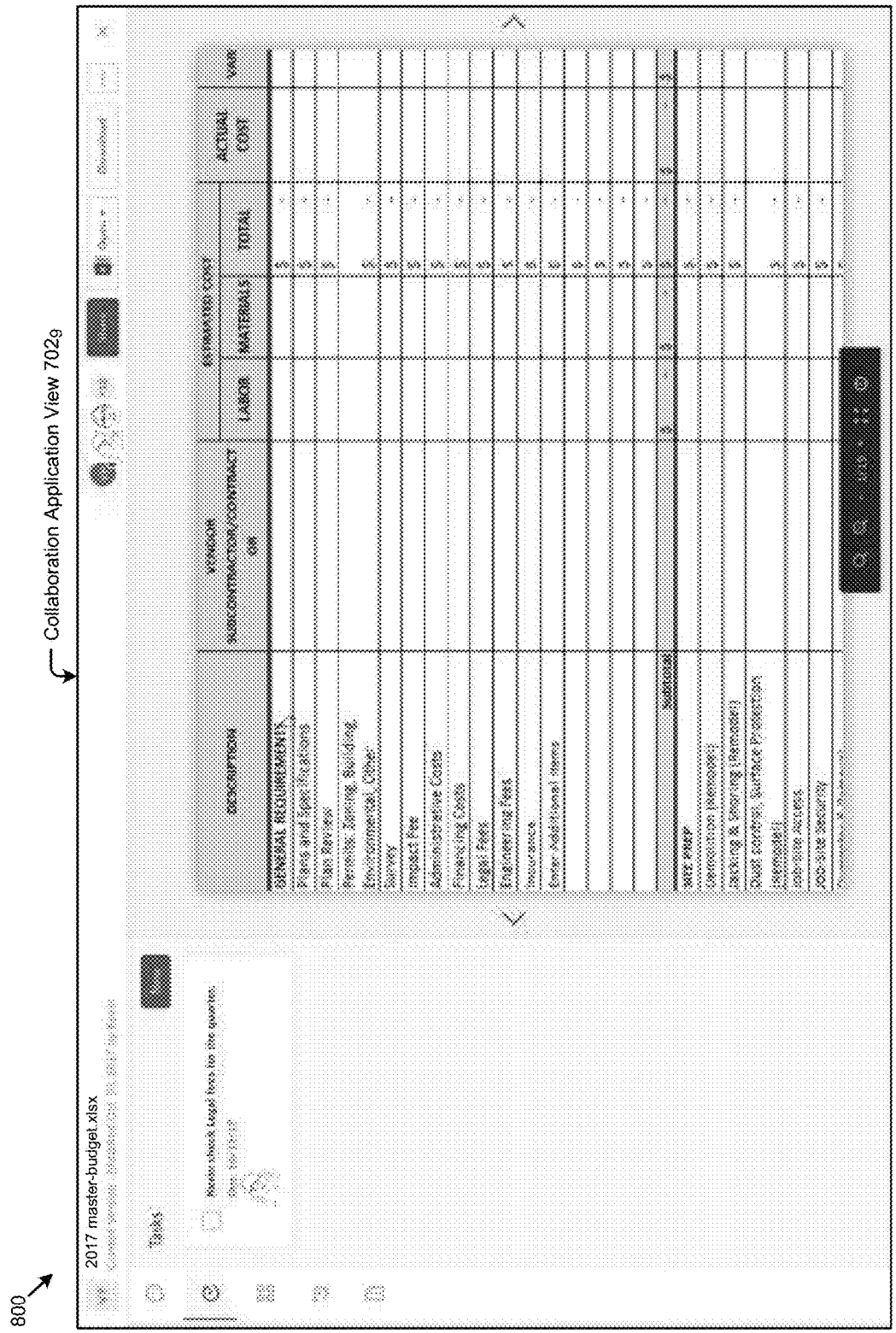
FIG. 8A, FIG. 8B, and FIG. 8C present various collaboration application views as presented during progression through an embedded content object interaction scenario as performed in systems that facilitate managing collaboration activities over shared content objects that are embedded in other shared content objects, according to an embodiment.
Figure 8B:
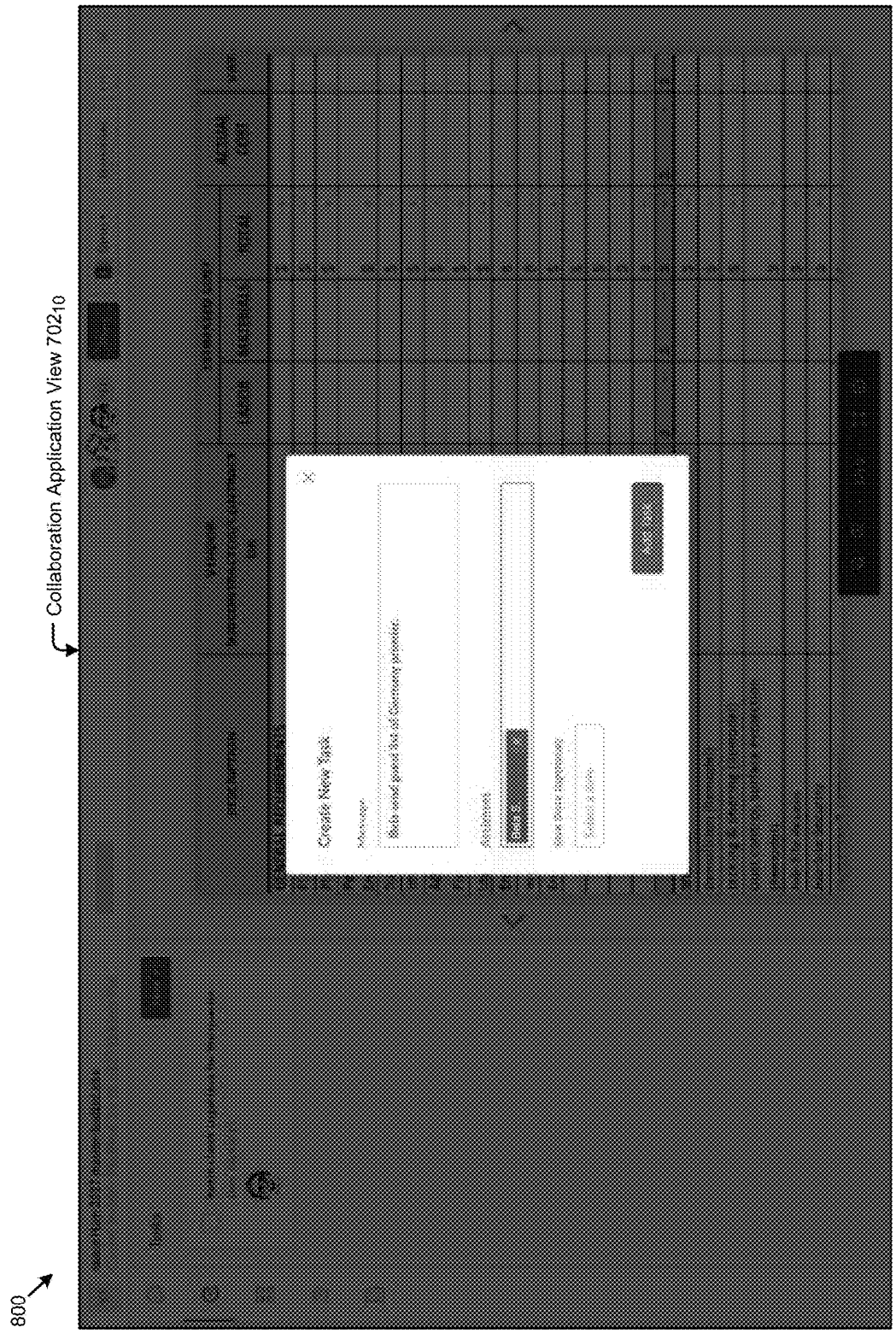
Figure 8C:
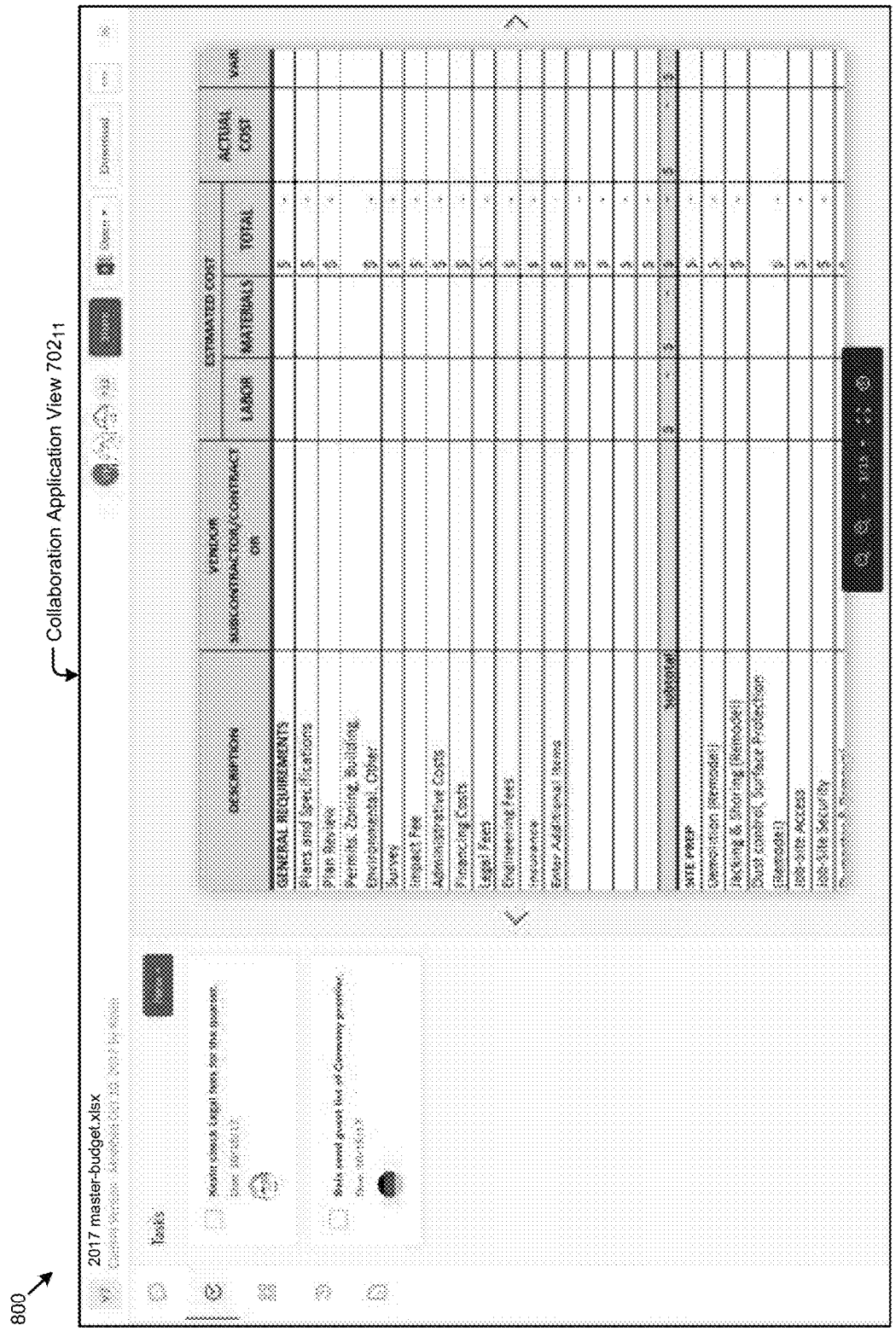

FIG. 8A, FIG. 8B, and FIG. 8C present various collaboration application views as presented during progression through an embedded content object interaction scenario 800 as performed in systems that facilitate managing collaboration activities over shared content objects that are embedded in other shared content objects. As an option, one or more variations of embedded content object interaction scenario 800 or any aspect thereof may be implemented in the context of the architecture and functionality of the embodiments described herein. The embedded content object interaction scenario 800 or any aspect thereof may be implemented in any environment.

FIG. 8A through FIG. 8C illustrate aspects pertaining to automatically replicating local changes over an embedded content object to a remotely-stored shared instance of the embedded content object. Specifically, the figures are being presented to illustrate various user interface views of a collaboration application that facilitates collaboration activities over embedded content objects.

FIG. 8A depicts a collaboration application view $702_9$ showing a spreadsheet document that is associated with a task. The embodiment shown in FIG. 8A is merely one example. As shown, the document can be viewed using preview tools, or the document can be opened using a native application as downloaded to a user's local machine for local processing. In some embodiments, a user's local machine might be configured with a browser and any needed browser plug-ins as well as a complement of native applications such that a download of the preview tools and/or browsers, and/or browser plug-ins, and/or native applications is not needed.

Furthermore, using screen devices (e.g., buttons, menus, etc.) that appear in the collaboration application view $702_9$, a user can create associations between the embedded spreadsheet document and other items. For example, a user can add an additional task in association with the embedded spreadsheet document, which additional task can be assigned to a collaborator.

FIG. 8B depicts a collaboration application view $702_{10}$ showing a spreadsheet document being associated with a task item. The embodiment shown in FIG. 8B is merely one example. In some embodiments, one or more documents can be associated with the task. When the task widget appears in the workspace of the task recipient, an indication of the associated document is available for the user. By clicking on a particular area of the task widget that appears in the workspace of the task, the recipient opens the associated document. Such a document might be a document that is shared. In some cases, a task might be directed to a user who is an authorized editor. One such example is given in the following FIG. 8C.

FIG. 8C depicts a collaboration application view $702_{11}$ showing a spreadsheet document that is associated with a task. In some cases, a document is shared with many authors. As shown, the authors are indicated in the view (e.g., by user avatars).

Additional Embodiments of the Disclosure

Additional Practical Application Examples

Figure 9:
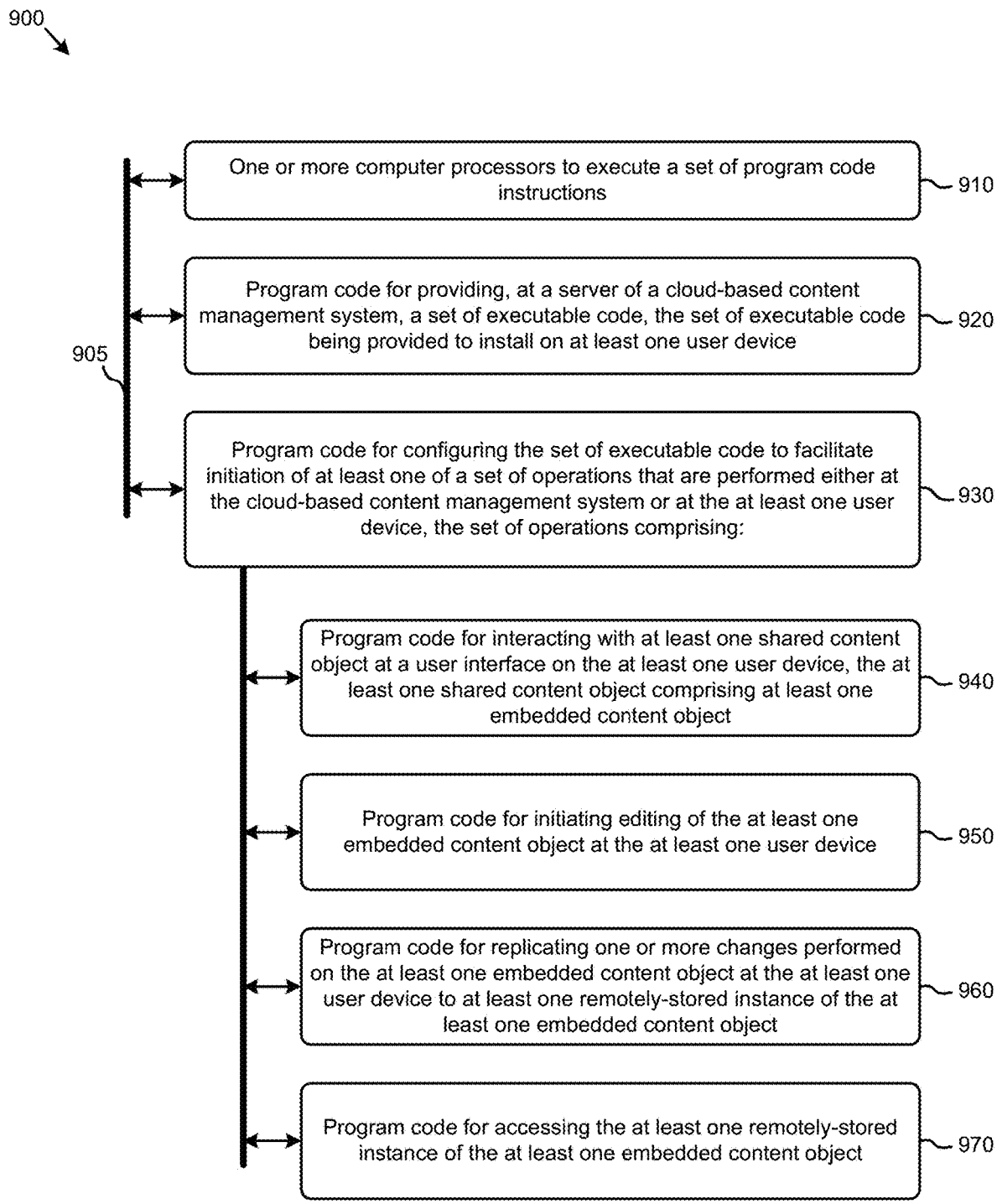
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually or as combined, serve to form improved technological processes that address facilitating collaboration activities over embedded content objects while avoiding conflicts associated with changes made to the embedded content objects. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with any other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: providing, at a server of a cloud-based content management system, a set of executable code, the set of executable code being provided to install on at least one user device (module 920); configuring the set of executable code to facilitate initiation of at least one of a set of operations that are performed either at the cloud-based content management system or at the at least one user device, the set of operations comprising (module 930); interacting with at least one shared content object at a user interface on the at least one user device, the at least one shared content object comprising at least one embedded content object (module 940); initiating editing of the at least one embedded content object at the at least one user device (module 950); replicating one or more changes performed on the at least one embedded content object at the at least one user device to at least one remotely-stored instance of the at least one embedded content object (module 960); and accessing the at least one remotely-stored instance of the at least one embedded content object (module 970).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 10A:
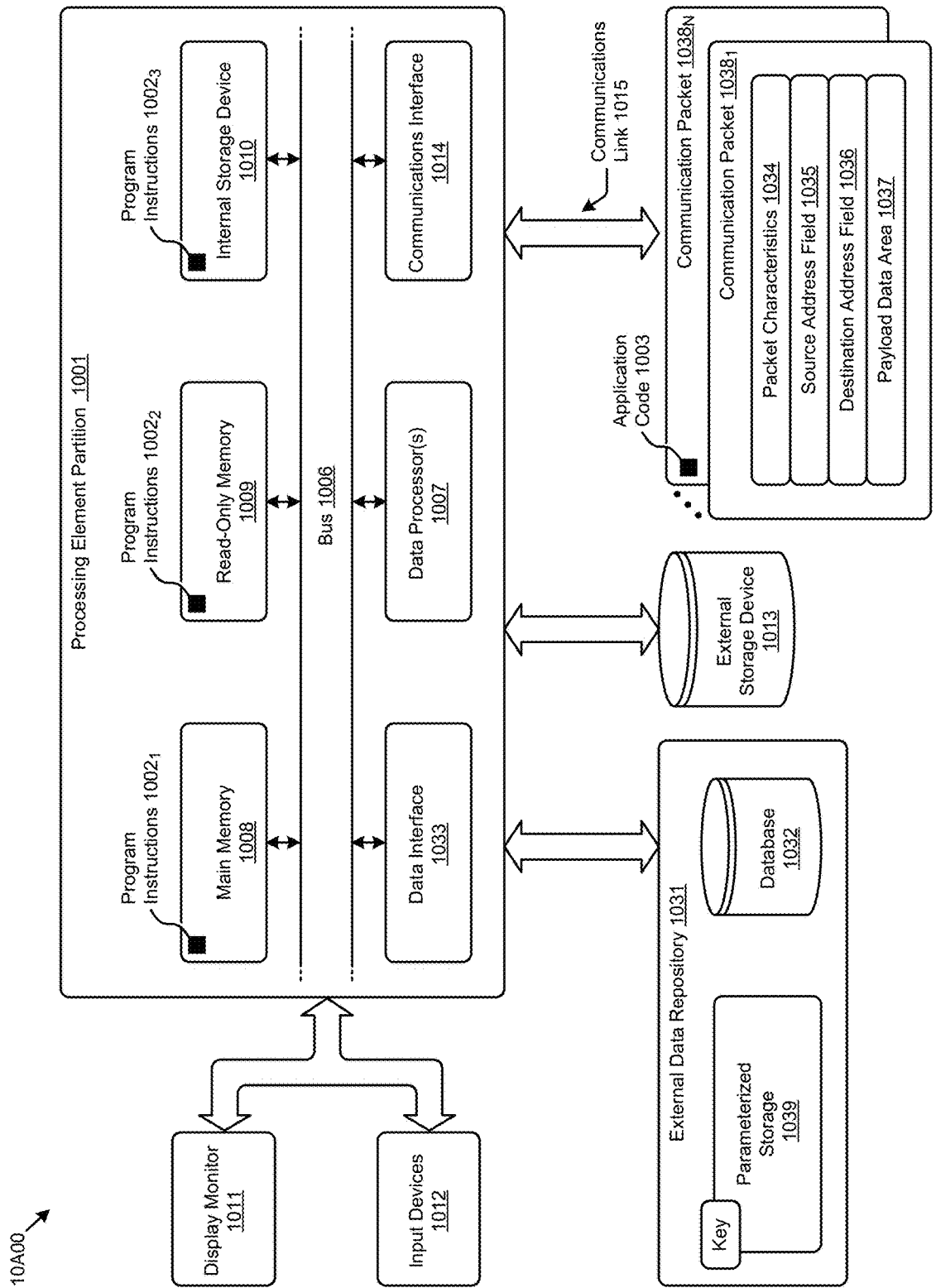
FIG. 10A and FIG. 10B present block diagrams of computer system architectures having components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program code may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to managing collaboration activities over shared content objects that are embedded in other shared content objects. A module may include one or more state machines and/or combinational logic used to implement or facilitate the operational and/or performance characteristics pertaining to managing collaboration activities over shared content objects that are embedded in other shared content objects.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing collaboration activities over shared content objects that are embedded in other shared content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing collaboration activities over shared content objects that are embedded in other shared content objects, and/or for improving the way data is manipulated when performing computerized operations pertaining to automatically replicating local changes over an embedded content object to a remotely-stored shared instance of the embedded content object.

Figure 10B:
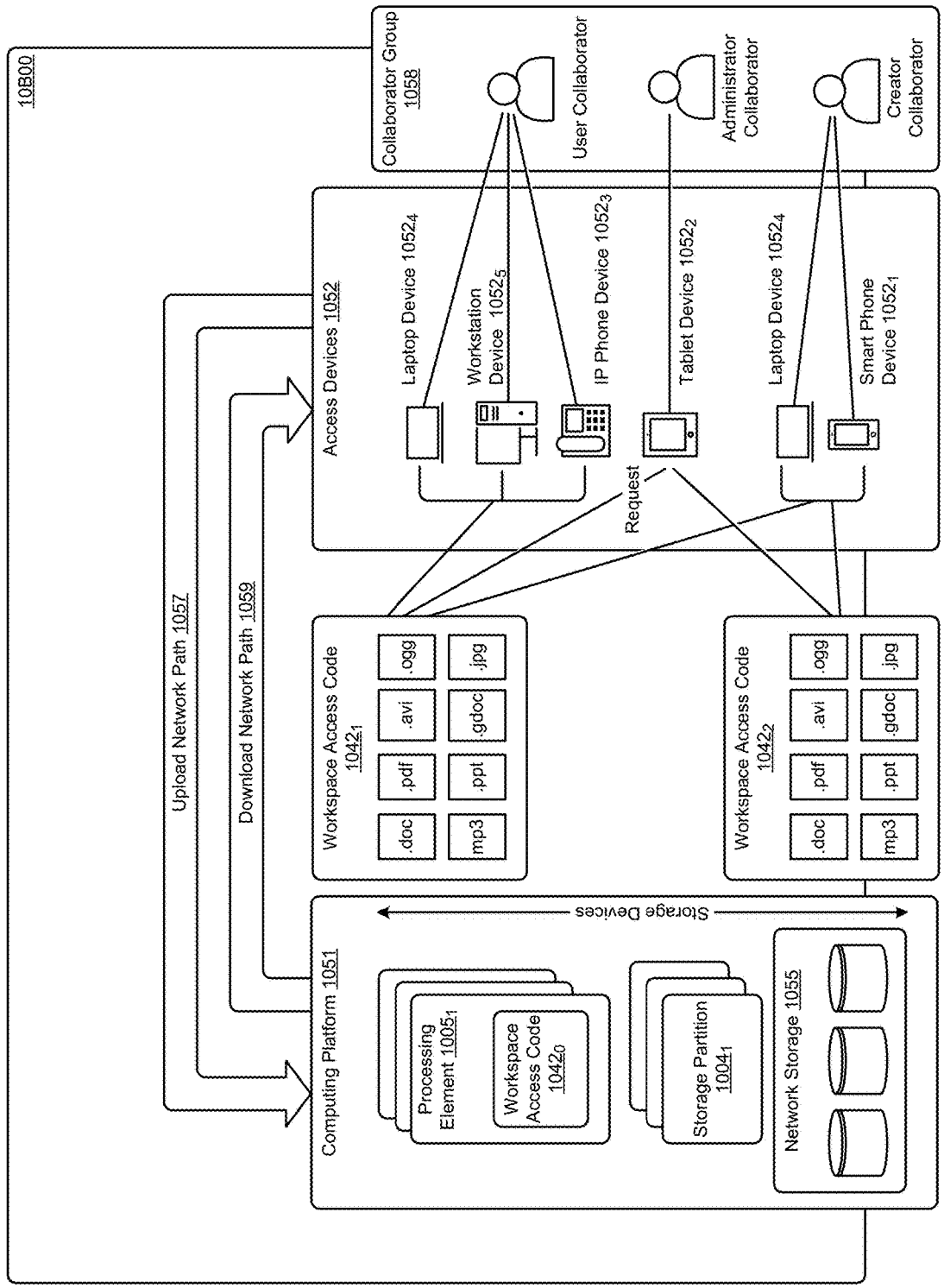

FIG. 10B depicts a block diagram of an instance of a cloud-based environment 10B00. Such a cloud-based environment supports access to workspaces through the execution of workspace access code (e.g., workspace access code 1042$_0$, workspace access code 1042$_1$, and workspace access code 1042$_2$). Workspace access code can be executed on any of access devices 1052 (e.g., laptop device 1052$_4$, workstation device 1052$_5$, IP phone device 1052$_3$, tablet device 1052$_2$, smart phone device 1052$_1$, etc.), and can be configured to access any type of object. Strictly as examples, such objects can be folders or directories or can be files of any file type. A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element 1005$_1$). The workspace access code can interface with storage devices such as networked storage 1055. Storage of workspaces and/or any constituent files or objects, and/or any other code or scripts or data can be stored in any one or more storage partitions (e.g., storage partition 1004$_1$). In some environments, a processing element includes forms of storage such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for facilitating embedded content object collaboration, the method performed by at least one computer and comprising:
    identifying, from a repository accessible by a server of a collaboration system, a shared content object and an embedded shared content object that are concurrently edited on a first user device and a second user device that are in network communication with the server, wherein
        the embedded shared content object of a first object type is embedded within the shared content object of a second object type,
        the shared content object is accessed by a web-based first application provided by the collaboration system, and
        the embedded shared content object is accessed locally by a second application stored locally on at least the first user device for concurrent editing and the embedded shared content object includes a first object and a second object, wherein
            the first object is embedded in a shared content object instance on the first user device and is an embedded shared content object preview representing a remotely-stored embedded shared content object that consumes less data than the remotely-stored embedded shared content object, and
            the second object is an embedded shared content object instance corresponding to a remotely-stored embedded shared content object instance sent to the first user device and embedded in the shared content object instance;
    sending a shared content object instance and the embedded shared content object preview to the first user device that comprises both a browser component that links the first user device with the web-based first application to edit the shared content object instance and the second application configured to edit the embedded shared content object instance on the first user device, wherein a sequence to edit the embedded shared content object instance on the first user device comprises:
        accessing an embedded object view control presented in a view of the shared content object that includes a separate embedded shared content object preview of the embedded shared content object, wherein the embedded object view control, when interacting upon the embedded shared content object preview, invokes the second application for editing the embedded shared content object instance, and
        sending the remotely-stored embedded shared content object instance to the first user device in response to invoking the second application when the embedded shared content object preview is interacted upon;
    receiving, by the server of the collaboration system, one or more changes made by the second application to the embedded shared content object instance;
    updating the remotely-stored embedded shared content object instance of the embedded shared content object with the one or more changes made to the embedded shared content object instance on the first user device into an updated instance; and
    broadcasting data pertaining to at least a portion of the updated instance to the second user device on which the embedded shared content object is concurrently edited.

2. The method of claim 1, wherein the second application is selected based at least in part on at least one of the second object type of the shared content object, the first object type of the embedded shared content object, one or more object metadata attributes, one or more user preferences, or one or more environment attributes.

3. The method of claim 2, wherein the second application comprises a spreadsheet editing application, a presentation editing application, or an image editing application.

4. The method of claim 1, further comprising:
    receiving, at the server, a different change made to a separate embedded shared content object instance of the embedded shared content object on the second user device;
    determining a conflict between the different change made on the second user device and at least one of the one or more changes made on the first user device; and
    broadcasting reconciled information pertaining to a conflict remediation process performed on the conflict to the first and the second user devices.

5. The method of claim 1, further comprising generating one or more embedded shared content object previews for the separate embedded shared content object preview of the embedded shared content object in a user interface for the collaboration system for previewing the embedded shared content object instance in the user interface, and the one or more embedded shared content object previews associated with the embedded shared content object have a lower resolution image derived from the embedded shared content object.

6. The method of claim 1, further comprising:
    presenting the embedded shared content object as a navigable preview object in a user interface for the collaboration system with one or more view controls on the navigable preview object, wherein the navigable preview object comprises the separate embedded shared content object preview and one or more additional views, and the one or more view controls are configured to navigate through the separate embedded shared content object preview and the one or more additional views without invoking or executing the second application; and
    broadcasting an updated navigable preview object to at least the second user device, wherein the navigable preview object is updated into the updated navigable preview object with the one or more changes based at least in part upon the updated instance.

7. The method of claim 1, further comprising updating metadata corresponding to the embedded shared content object into updated metadata, wherein the metadata comprises a version identifier and a hierarchical relationship between the shared content object and the embedded shared content object, and the version identifier uniquely identifies the remotely-stored embedded shared content object instance.

8. The method of claim 1, wherein the web-based first application comprises one or more embedded object view controls that are configured for navigating through a plurality of embedded shared content object previews of the embedded shared content object instance on the first user device, and the plurality of embedded shared content object previews consumes less data or memory footprint than an actual data size or memory footprint consumed by the embedded shared content object.

9. The method of claim 1, broadcasting data pertaining to at least a portion of the updated instance comprising:
generating an updated graphical representation for the separate embedded shared content object preview of the embedded shared content object based at least in part upon the one or more changes made on the first user device; and
sending at least the updated graphical representation to the second user device for updating a corresponding graphical representation of a different embedded shared content object instance on the second user device, wherein the updated graphical representation or the corresponding graphical representation comprises a preview or a thumbnail associated with the embedded shared content object.

10. The method of claim 1, further comprising:
generating an updated parent content object for the embedded shared content object based at least in part upon the one or more changes made to the embedded shared content object instance on the first user device.

11. A non-transitory computer readable medium having stored thereon a sequence of instructions which, when stored in memory and executed by one or more processors, causes the one or more processors to perform a set of acts for facilitating embedded shared content object collaboration, the set of acts comprising:
identifying, from a repository accessible by a server of a collaboration system, a shared content object and an embedded shared content object that are concurrently edited on a first user device and a second user device that are in network communication with the server, wherein
the embedded shared content object of a first object type is embedded within the shared content object of a second object type,
the shared content object is accessed by a web-based first application provided by the collaboration system, and
the embedded shared content object is accessed locally by a second application stored locally on at least the first user device for concurrent editing and the embedded shared content object includes a first object and a second object, wherein
the first object is embedded in a shared content object instance on the first user device and is an embedded shared content object preview representing a remotely-stored embedded shared content object that consumes less data than the remotely-stored embedded shared content object, and
the second object is an embedded shared content object instance corresponding to a remotely-stored embedded shared content object instance sent to the first user device and embedded in the shared content object instance;
sending a shared content object instance and the embedded shared content object preview to the first user device that comprises both a browser component that links the first user device with the web-based first application to edit the shared content object instance and the second application configured to edit the embedded shared content object instance on the first user device, wherein a sequence to edit the embedded shared content object instance on the first user device comprises:
accessing an embedded object view control presented in a view of the shared content object that includes a separate embedded shared content object preview of the embedded shared content object, wherein the embedded object view control, when interacting upon the embedded shared content object preview, invokes the second application for editing the embedded shared content object, and
sending the remotely-stored embedded shared content object instance to the first user device in response to invoking the second application when the embedded shared content object preview is interacted upon;
receiving, by the server of the collaboration system, one or more changes made by the second application to the embedded shared content object instance;
updating the remotely-stored embedded shared content object instance of the embedded shared content object with the one or more changes made to the embedded shared content object instance on the first user device into an updated instance; and
broadcasting data pertaining to at least a portion of the updated instance to the second user device on which the embedded shared content object is concurrently edited.

12. The non-transitory computer readable medium of claim 11, wherein the second application is selected based at least in part on at least one of the second object type of the shared content object, the first object type of the embedded shared content object, one or more object metadata attributes, one or more user preferences, or one or more environment attributes.

13. The non-transitory computer readable medium of claim 12, wherein the second application comprises a spreadsheet editing application, a presentation editing application, or an image editing application.

14. The non-transitory computer readable medium of claim 11, the set of acts further comprising:
receiving, at the server, a different change made to a separate embedded shared content object instance of the embedded shared content object on the second user device;
determining a conflict between the different change made on the second user device and at least one of the one or more changes made on the first user device; and
broadcasting reconciled information pertaining to a conflict remediation process performed on the conflict to the first and the second user devices.

15. The non-transitory computer readable medium of claim 11, further comprising instructions which, when stored in memory and executed by the one or more processors causes the one or more processors to perform acts of generating one or more embedded shared content object previews for the separate embedded shared content object preview of the embedded shared content object, wherein the one or more embedded shared content object previews associated with at least one embedded shared content object have a lower resolution image derived from the at least one embedded shared content object.

16. The non-transitory computer readable medium of claim 11, the set of acts further comprising:

presenting the embedded shared content object as a navigable preview object in a user interface for the collaboration system with one or more view controls on the navigable preview object, wherein the navigable preview object comprises the separate embedded shared content object preview and one or more additional views, and the one or more view controls are configured to navigate through the separate embedded shared content object preview and the one or more additional views; and broadcasting an updated navigable preview object to at least the second user device, wherein the navigable preview object is updated into the updated navigable preview object with the one or more changes based at least in part upon the updated instance.

17. The non-transitory computer readable medium of claim 11, further comprising instructions which, when stored in memory and executed by the one or more processors causes the one or more processors to perform acts of updating metadata corresponding to the embedded shared content object into updated metadata, wherein the metadata comprises a version identifier and a hierarchical relationship between the shared content object and the embedded shared content object, and the version identifier uniquely identifies the remotely-stored embedded shared content object instance.

18. The non-transitory computer readable medium of claim 11, wherein the web-based first application comprises one or more embedded object view controls that are configured for navigating through a plurality of embedded shared content object previews of the embedded shared content object instance on the first user device, and the plurality of embedded shared content object previews consumes less data or memory footprint than an actual data size of memory footprint consumed by the embedded shared content object.

19. A system for facilitating embedded shared content object collaboration, the system performed by at least one computer and comprising:
   a non-transitory storage medium having stored thereon a sequence of instructions; and
   one or more processors that execute the sequence instructions, execution of the sequence of instructions causing the one or more processors to perform a set of acts, the set of acts comprising,
   identifying, from a repository accessible by a server of a collaboration system, a shared content object and an embedded shared content object that are concurrently edited on a first user device and a second user device that are in network communication with the server, wherein
      the embedded shared content object of a first object type is embedded within the shared content object of a second object type,
      the shared content object is accessed by a web-based first application provided by the collaboration system, and
      the embedded shared content object is accessed locally by a second application stored locally on at least the first user device for concurrent editing and the embedded shared content object includes a first object and a second object, wherein
         the first object is embedded in a shared content object instance on the first user device and is an embedded shared content object preview representing a remotely-stored embedded shared content object that consumes less data than the remotely-stored embedded shared content object, and
         the second object is an embedded shared content object instance corresponding to a remotely-stored embedded shared content object instance sent to the first user device and embedded in the shared content object instance;
   sending a shared content object instance and the embedded shared content object preview to the first user device that comprises both a browser component that links the first user device with the web-based first application to edit the shared content object instance and the second application configured to edit the embedded shared content object instance on the first user device, wherein a sequence to edit the embedded shared content object instance on the first user device comprises:
      accessing an embedded object view control presented in a view of the shared content object that includes a separate embedded shared content object preview of the embedded shared content object, wherein the embedded object view control, when interacting upon the embedded shared content object preview, invokes the second application for editing the embedded shared content object, and
      sending the remotely-stored embedded shared content object instance to the first user device in response to invoking the second application when the embedded shared content object preview is interacted upon;
   receiving, by the server of the collaboration system, one or more changes made by the second application to the embedded shared content object instance;
   updating the remotely-stored embedded shared content object instance of the embedded shared content object with the one or more changes made to the embedded shared content object instance on the first user device into an updated instance; and
   broadcasting data pertaining to at least a portion of the updated instance to the second user device on which the embedded shared content object is concurrently edited.

20. The system of claim 19, wherein the second application is selected based at least in part on at least one of the second object type of the shared content object, the first object type of the embedded shared content object, one or more object metadata attributes, one or more user preferences, or one or more environment attributes.

21. A non-transitory computer readable medium having stored thereon a sequence of instructions which, when stored in memory and executed by a collaboration system having one or more processors, causes the one or more processors to perform a set of acts for facilitating embedded shared content object collaboration, the set of acts comprising:
   replicating one or more changes made to a first instance of an embedded shared content object on a first user device in a stored embedded shared content object instance that is stored together with a stored shared content object instance of a shared content object in a repository accessible by a server of a collaboration system, wherein
      the embedded shared content object of a first object type is embedded within the shared content object of a second object type,
      the embedded shared content object includes a first object and a second object, wherein
         the first object is embedded in a shared content object instance on the first user device and is an embedded shared content object preview representing a remotely-stored embedded shared content object that consumes less data than the remotely-stored embedded shared content object, and the second object is an embedded shared content object instance corresponding to a remotely-stored embedded shared content object sent to the first user device and embedded in the shared content object instance, the one or more changes to the first instance of the embedded shared content object are made within a user interface of the first user device to form an updated instance of the embedded shared content object, and the embedded shared content object of the first object type is locally edited by a second application stored locally on a second user device and the first user device for concurrent editing of the embedded shared content object, and the concurrent editing comprises:

accessing an embedded object view control presented in a view of the shared content object that includes a separate embedded shared content object preview of the first instance of the embedded shared content object, wherein the embedded object view control, when interacting upon the embedded shared content object preview, invokes the second application for editing the embedded shared content object, the first instance of the embedded shared content object and a second instances of the embedded shared content object are respectively sent to the first and the second user devices from the collaboration system for concurrent editing, and sending the first instance of the remotely-stored embedded shared content object and a second instance of the remotely-stored embedded shared content object respectively to the first and second user device in response to invoking the second application when the embedded shared content object preview is interacted upon;

replicating, at the server, the one or more changes, which have been made to the first instance of the embedded shared content object, to the stored embedded shared content object instance in the repository; and broadcasting first data pertaining to at least a portion of the updated instance to the second user device and second data pertaining to a separate updated instance of the embedded shared content object modified from a separate instance of the embedded shared content object on the second user device to the first user device.

22. The non-transitory computer readable medium of claim 21, wherein the acts further comprise generating at least one object tree, the at least one object tree codifying one or more relationships between the shared content object and the embedded shared content object.

23. The non-transitory computer readable medium of claim 21, wherein the set of acts further comprise publishing at least one event message to an event stream, the at least one event message corresponding to the first and the second data being respectively broadcast to the second user device and the first user device.

24. The non-transitory computer readable medium of claim 21, wherein the set of acts further comprises presenting the first instance of the embedded shared content object within a second instance of the shared content object as one or more embedded shared content object previews, wherein the one or more embedded shared content object previews comprise one or more view controls that are configured to navigate through a preview having a plurality of embedded content object previews of the first instance in the user interface for the collaboration system for previewing the embedded shared content object instance.

25. The non-transitory computer readable medium of claim 21, wherein an editing application provided by the collaboration system for editing the shared content object into which the embedded shared content object is embedded comprises one or more embedded object view controls that are configured for navigating through a plurality of embedded shared content object previews of the first instance of the embedded shared content object on the first user device, and the plurality of embedded shared content object previews consume less data or memory footprint than the first instance of the embedded shared content object.

26. The non-transitory computer readable medium of claim 25, wherein broadcasting the first data to the second user device comprises:

generating an updated graphical representation for the embedded shared content object based at least in part upon the one or more changes made on the first user device; and broadcasting data pertaining to at least the updated graphical representation to the second user device for updating a corresponding graphical representation of a different embedded shared content object instance on the second user device, wherein the updated graphical representation or the corresponding graphical representation comprises a separate preview or a thumbnail associated with the embedded shared content object.

27. The non-transitory computer readable medium of claim 21, wherein the set of acts further comprise generating one or more embedded shared content object previews associated with the embedded shared content object, wherein the embedded shared content object preview of the one or more embedded shared content object previews associated with the embedded shared content object has a lower resolution image derived from the embedded shared content object.

28. The non-transitory computer readable medium of claim 27, wherein at least one of the one or more embedded shared content object previews associated with the embedded shared content object comprises a preview or a thumbnail of the embedded shared content object.

29. The non-transitory computer readable medium of claim 21, the set of acts further comprising:

receiving, at the collaboration system, a different change made to a separate instance of the embedded shared content object on the second user device;

determining a conflict between the different change made on the second user device and at least one of the one or more changes made on the first user device; and broadcasting reconciled information pertaining to a conflict remediation process performed by the collaboration system on the conflict to the first and the second user devices.

30. The non-transitory computer readable medium of claim 21, the set of acts further comprising:

generating an updated parent content object for the embedded shared content object based at least in part upon the one or more changes made to the first instance of the embedded shared content object on the first user device.

* * * * *